US011569756B2

United States Patent
Oi et al.

(10) Patent No.: US 11,569,756 B2
(45) Date of Patent: Jan. 31, 2023

(54) FLYING CAPACITOR TYPE 3-LEVEL POWER CONVERSION DEVICE

(71) Applicant: MEIDENSHA CORPORATION, Tokyo (JP)

(72) Inventors: Kazunobu Oi, Numadu (JP); Kenji Kobori, Shizuoka (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/690,227

(22) Filed: Mar. 9, 2022

(65) Prior Publication Data

US 2022/0209682 A1 Jun. 30, 2022

Related U.S. Application Data

(63) Continuation of application No. 17/437,198, filed as application No. PCT/JP2020/003319 on Jan. 30, 2020, now Pat. No. 11,303,220.

(30) Foreign Application Priority Data

Mar. 19, 2019 (JP) .................................. 2019-050592

(51) Int. Cl.
 *H02M 7/483* (2007.01)
 *H02M 1/44* (2007.01)
 (Continued)

(52) U.S. Cl.
 CPC ........... *H02M 7/4833* (2021.05); *H02M 1/44* (2013.01); *H02M 3/158* (2013.01); *H02M 7/483* (2013.01);
 (Continued)

(58) Field of Classification Search
 CPC .... H02M 7/4837; H02M 1/44; H02M 7/5387; H02M 1/0095; H02M 7/538
 See application file for complete search history.

(56) References Cited

U.S. PATENT DOCUMENTS

| 5,737,201 A | 4/1998 | Meynard et al. |
| 9,831,778 B2 | 11/2017 | Kidera et al. |

(Continued)

FOREIGN PATENT DOCUMENTS

| JP | 06-067181 B2 | 8/1994 |
| JP | 3301761 B2 | 7/2002 |

(Continued)

*Primary Examiner* — Yusef A Ahmed
(74) *Attorney, Agent, or Firm* — Foley & Lardner LLP

(57) ABSTRACT

A flying capacitor (FC)-type 3-level power conversion device turns on or off first to fourth semiconductor switching elements based on comparison between a flying capacitor voltage and a half of higher-voltage side filter capacitor voltage, comparison between the higher-voltage side filter capacitor voltage and the flying capacitor voltage plus a lower-voltage side filter capacitor voltage, comparison between the flying capacitor voltage and the lower-voltage side filter capacitor voltage, and comparison between the lower-voltage side filter capacitor voltage or the higher-voltage side filter capacitor voltage and a filter capacitor voltage command value, so that an electric current flows along a path including a filter reactor L and charging a flying capacitor so as to charge a lower-voltage side filter capacitor or a higher-voltage side filter capacitor to predetermined values.

2 Claims, 20 Drawing Sheets

(51) Int. Cl.
*H02M 3/158* (2006.01)
*H02M 7/5387* (2007.01)
*H02M 1/00* (2006.01)
*H02M 7/539* (2006.01)

(52) U.S. Cl.
CPC ........ *H02M 7/5387* (2013.01); *H02M 1/0074* (2021.05); *H02M 1/0077* (2021.05); *H02M 1/0095* (2021.05); *H02M 7/4837* (2021.05); *H02M 7/539* (2013.01)

(56) References Cited

U.S. PATENT DOCUMENTS

| | | | | |
|---|---|---|---|---|
| 10,530,256 | B1* | 1/2020 | Jayaraman | H02M 3/1584 |
| 10,554,124 | B1* | 2/2020 | Mangudi | H02M 1/08 |
| 10,686,370 | B1* | 6/2020 | Bonnano | H02M 3/07 |
| 2009/0033289 | A1* | 2/2009 | Xing | H02M 3/1588 |
| | | | | 320/140 |
| 2009/0033293 | A1* | 2/2009 | Xing | H02M 3/1588 |
| | | | | 323/284 |
| 2011/0280052 | A1* | 11/2011 | Al-Haddad | H02M 7/4837 |
| | | | | 363/84 |
| 2012/0319664 | A1* | 12/2012 | Fujii | H02J 7/345 |
| | | | | 323/271 |
| 2014/0184189 | A1* | 7/2014 | Salem | H02M 3/158 |
| | | | | 323/299 |
| 2016/0126833 | A1* | 5/2016 | Yatsu | H02M 3/07 |
| | | | | 323/312 |
| 2016/0299554 | A1* | 10/2016 | Kumar | G06F 1/26 |
| 2016/0329809 | A1* | 11/2016 | Granato | H02M 7/4837 |
| 2017/0149336 | A1* | 5/2017 | Kidera | H02M 3/158 |
| 2017/0155321 | A1* | 6/2017 | Kidera | H02M 7/483 |
| 2017/0310242 | A1* | 10/2017 | Kifuji | H02M 7/539 |
| 2017/0373598 | A1* | 12/2017 | Nishimura | H02M 1/126 |
| 2018/0006559 | A1 | 1/2018 | Chen et al. | |
| 2018/0019665 | A1* | 1/2018 | Zhang | H02M 1/36 |
| 2018/0019669 | A1* | 1/2018 | Zhang | H02M 1/08 |
| 2019/0058397 | A1* | 2/2019 | Lazaro | H02M 7/4837 |
| 2019/0190373 | A1* | 6/2019 | Nussbaum | H02M 3/07 |
| 2019/0334433 | A1* | 10/2019 | Woo | H02M 7/4837 |
| 2019/0379287 | A1* | 12/2019 | Zhang | H02M 3/07 |
| 2020/0195146 | A1* | 6/2020 | Kihara | H02M 3/155 |
| 2020/0350817 | A1* | 11/2020 | De | H02M 3/155 |
| 2021/0067033 | A1* | 3/2021 | Jing | H02M 3/158 |
| 2021/0111643 | A1* | 4/2021 | Hsin | H02M 7/487 |
| 2021/0119465 | A1* | 4/2021 | Choi | H02M 1/0095 |
| 2021/0152100 | A1* | 5/2021 | Zilio | H02M 7/4837 |
| 2021/0194364 | A1* | 6/2021 | Jung | H02M 3/07 |
| 2021/0313877 | A1* | 10/2021 | Kim | H02M 3/158 |
| 2021/0313886 | A1* | 10/2021 | Kim | H02M 1/08 |
| 2021/0313892 | A1* | 10/2021 | Kim | H02M 1/325 |
| 2021/0336529 | A1* | 10/2021 | Zhou | H01H 71/123 |
| 2022/0286049 | A1* | 9/2022 | Fujii | H02M 3/158 |

FOREIGN PATENT DOCUMENTS

| | | |
|---|---|---|
| JP | 2015-216789 A | 12/2015 |
| JP | 2015-216790 A | 12/2015 |
| JP | 2016-059132 A | 4/2016 |
| JP | 2017-163622 A | 9/2017 |
| JP | 2018-129968 A | 8/2018 |

* cited by examiner

FLYING CAPACITOR TYPE 3-LEVEL POWER CONVERSION DEVICE

CROSS REFERENCE TO RELATED APPLICATIONS

This application is a continuation application of U.S. application Ser. No. 17/437,198, filed Sep. 8, 2021, which is the National Stage of Application No. PCT/JP2020/003319 filed on Jan. 30, 2020, which is based upon and claims the benefit of priority from Japanese Application No. 2019-050592, filed Mar. 19, 2019, the entire contents of all of which are incorporated herein by reference.

TECHNICAL FIELD

The present invention relates to voltage control of a flying capacitor and a filter capacitor of a flying capacitor (FC) type three-level power conversion device.

BACKGROUND ART

FIG. 21 shows an FC-type three-level chopper circuit disclosed in a patent document 1. FIG. 22 shows an example of an FC-type three-level conversion device that is composed of units and capable of differential output. In the present description, a term "FC-type three-level power conversion device" is used to refer to FC-type three-level chopper circuits as shown in FIG. 21 and FC-type three-level conversion devices as shown in FIG. 22.

An FC-type three-level power conversion device has an output voltage ripple that is half an output voltage ripple of a two-level device. Furthermore, an FC-type three-level power conversion device has a breaking voltage that is half a breaking voltage of a two-level device. This reduces a switching loss of a semiconductor switching element, and thereby allows a switching frequency to be easily increased. This feature is suitable for a device that requires high efficiency, high response speed, and low ripple.

In order to operate an FC-type three-level power conversion device normally, it is required to control a flying capacitor voltage Vfc, Vfc1, Vfc2 to half of voltage of a direct current voltage source. When the flying capacitor voltage Vfc, Vfc1, Vfc2 deviates, a problem may occur in which an excessive voltage is applied to some semiconductor switching elements so as to increase a ripple superimposed on an output voltage, and distort a waveform of the output voltage and a waveform of an output current, and cause malfunctioning of surrounding devices and overheating of filter reactors, filter capacitors, and transformers.

Patent documents 2 and 3 each disclose an FC voltage control method for an FC-type three-level inverter, which can be directly applied to an FC-type three-level chopper circuit.

In an FC-type three-level conversion device having an LC filter capable of differential output, where a direct current voltage source voltage Vdc is equal to E, first to eighth semiconductor switching elements T1 to T8 are turned on and off so as to control first and second flying capacitor voltages Vfc1 and Vfc2 to E/2 (half of Vdc), and also output and apply three-level voltages (E, E/2, 0) to a load via a node between the second and third semiconductor switching elements T2 and T3 and a node between the sixth and seventh semiconductor switching elements T6 and T7.

Such FC-type three-level conversion devices are detailed in a patent document 5 and common documents.

For controlling a flying capacitor voltage as in patent documents 2 and 3, the device needs to output an electric current. Accordingly, while the device is at rest, the flying capacitor voltage decreases due to self-discharging. In addition, a separate means is required for charging the flying capacitor to about half of the direct current voltage before operation.

Furthermore, a filter capacitor is connected to a general power conversion device for the purpose of removing switching ripples. For example, when a battery is connected to the device, an inrush current flows from the battery to the filter capacitor. For preventing this, it is required to charge the filter capacitor to the same voltage as the battery in advance. According to a patent document 4, such filter capacitor charging is impossible, because connection of a filter capacitor is not assumed.

In view of the foregoing, it is a problem in an FC-type three-level power conversion device to charge both a flying capacitor and a filter capacitor without outputting an electric current to the outside of the device.

PRIOR ART DOCUMENT(S)

Patent Document(s)

Patent Document 1: Japanese Patent Application Publication No. H06-67181
Patent Document 2: Japanese Patent No. 3301761
Patent Document 3: Japanese Patent Application Publication No. 2018-129968
Patent Document 4: Japanese Patent Application Publication No. 2015-216790
Patent Document 5: Japanese Patent Application Publication No. 2017-163622

SUMMARY OF INVENTION

The present invention has been made in view of the conventional problems described above. According to one aspect, an FC-type three-level power conversion device includes: a higher voltage side filter capacitor; first to fourth semiconductor switching elements connected in series between a positive electrode and a negative electrode of the higher voltage side filter capacitor, and arranged in this order from the positive electrode to the negative electrode; a flying capacitor connected between a node between the first and second semiconductor switching elements and a node between the third and fourth semiconductor switching elements; a filter reactor including a first end connected to a node between the second and third semiconductor switching elements; a lower voltage side filter capacitor connected between the negative electrode of the higher voltage side filter capacitor and a second end of the filter reactor opposite to the first end; and a direct current voltage source connected in parallel with the higher voltage side filter capacitor or the lower voltage side filter capacitor; wherein the first to fourth semiconductor switching elements are configured to be turned on and off so as to cause an electric current to flow along a path including the filter reactor, charge the flying capacitor to a predetermined value, and charge the lower voltage side filter capacitor or the higher voltage side filter capacitor to a predetermined value, based on comparison between voltage of the flying capacitor and half of voltage of the higher voltage side filter capacitor, comparison between the voltage of the higher voltage side filter capacitor and a sum of the voltage of the flying capacitor and voltage of the lower voltage side filter capacitor, and comparison between a filter capacitor voltage command value and the voltage of the lower voltage side filter capacitor or the higher voltage side filter capacitor.

According to another aspect, an FC-type three-level power conversion device includes: a higher voltage side filter capacitor; first to fourth semiconductor switching elements connected in series between a positive electrode and a negative electrode of the higher voltage side filter capacitor, and arranged in this order from the negative electrode to the positive electrode; a flying capacitor connected between a node between the first and second semiconductor switching elements and a node between the third and fourth semiconductor switching elements; a filter reactor including a first end connected to a node between the second and third semiconductor switching elements; a lower voltage side filter capacitor connected between the positive electrode of the higher voltage side filter capacitor and a second end of the filter reactor opposite to the first end; and a direct current voltage source connected in parallel with the higher voltage side filter capacitor or the lower voltage side filter capacitor; wherein the first to fourth semiconductor switching elements are configured to be turned on and off so as to cause an electric current to flow along a path including the filter reactor, charge the flying capacitor to a predetermined value, and charge the lower voltage side filter capacitor or the higher voltage side filter capacitor to a predetermined value, based on comparison between voltage of the flying capacitor and half of voltage of the higher voltage side filter capacitor, comparison between the voltage of the higher voltage side filter capacitor and a sum of the voltage of the flying capacitor and voltage of the lower voltage side filter capacitor, and comparison between a filter capacitor voltage command value and the voltage of the lower voltage side filter capacitor or the higher voltage side filter capacitor.

According to another aspect, an FC-type three-level power conversion device includes: a first unit including: first to fourth semiconductor switching elements connected in series between a positive electrode and a negative electrode of a direct current voltage source, and arranged in this order from the positive electrode to the negative electrode; and a first flying capacitor connected between a node between the first and second semiconductor switching elements and a node between the third and fourth semiconductor switching elements; a second unit including: fifth to eighth semiconductor switching elements connected in series between the positive electrode and the negative electrode of the direct current voltage source, and arranged in this order from the positive electrode to the negative electrode; and a second flying capacitor connected between a node between the fifth and sixth semiconductor switching elements and a node between the seventh and eighth semiconductor switching elements; a first filter reactor including a first end connected to a node between the second and third semiconductor switching elements; a second filter reactor including a first end connected to a node between the sixth and seventh semiconductor switching elements; and a filter capacitor connected between a second end of the first filter reactor opposite to the first end of the first filter reactor and a second end of the second filter reactor opposite to the first end of the second filter reactor; wherein the first to eighth semiconductor switching elements are configured to be turned on and off so as to cause an electric current to flow along a path including the first filter reactor and the second filter reactor, charge the first and second flying capacitors and the filter capacitor to respective predetermined values, based on comparison between voltage of each of the first and second flying capacitors and half of voltage of the direct current voltage source, comparison between voltage of the filter capacitor and a filter capacitor voltage command value, comparison between the voltage of the direct current voltage source and a sum of the voltage of the first flying capacitor, the voltage of the second flying capacitor, and the filter capacitor voltage command value, comparison between the voltage of the direct current voltage source and a value obtained by subtracting the filter capacitor voltage command value from a sum of the voltage of the first flying capacitor and the voltage of the second flying capacitor, comparison between the voltage of each of the first and second flying capacitors and the voltage of the filter capacitor, and comparison between the voltage of the first flying capacitor and the voltage of the second flying capacitor.

According to another aspect, the FC-type three-level power conversion device is configured such that: the direct current voltage source is connected in parallel with the higher voltage side filter capacitor; in response to a condition of $Vfc<Va/2$, $Vb<Vb^*$, and $Va>Vfc+Vb+\alpha$, the first semiconductor switching element is turned on and the second, third and fourth semiconductor switching elements are turned off; in response to a condition of $Vfc<Va/2$, $Vb<Vb^*$, and $Va\leq Vfc+Vb+\alpha$, the first and second semiconductor switching elements are turned on and the third and fourth semiconductor switching elements are turned off, and thereafter the first semiconductor switching element is turned on and the second, third and fourth semiconductor switching elements are turned off; in response to a condition of $Vfc<Va/2$, $Vb\geq Vb^*$, and $Vb>Vfc+\alpha$, the fourth semiconductor switching element is turned on and the first, second and third semiconductor switching elements are turned off; in response to a condition of $Vfc<Va/2$, $Vb\geq Vb^*$, and $Vb\leq Vfc+\alpha$, the third and fourth semiconductor switching elements are turned on and the first and second semiconductor switching elements are turned off, and thereafter the fourth semiconductor switching element is turned on and the first, second and third semiconductor switching elements are turned off; in response to a condition of $Vfc\geq Va/2$, $Vb<Vb^*$, and $Vfc>Vb+\alpha$, the second semiconductor switching element is turned on and the first, third and fourth semiconductor switching elements are turned off; in response to a condition of $Vfc\geq Va/2$, $Vb<Vb^*$, and $Vfc\leq Vb+\alpha$, the first and second semiconductor switching elements are turned on and the third and fourth semiconductor switching elements are turned off, and thereafter the second semiconductor switching element is turned on and the first, third and fourth semiconductor switching elements are turned off; in response to a condition of $Vfc\geq Va/2$ and $Vb\geq Vb^*$, the first to fourth semiconductor switching elements are maintained off; Vfc represents the voltage of the flying capacitor; Va represents the voltage of the higher voltage side filter capacitor; Vb represents the voltage of the lower voltage side filter capacitor; Vb* represents the filter capacitor voltage command value for the lower voltage side filter capacitor; and α represents a predetermined value.

According to another aspect, the FC-type three-level power conversion device is configured such that: the direct current voltage source is connected in parallel with the lower voltage side filter capacitor; in response to a condition of $Vfc<Va/2$, $Va>Va^*$, and $Va>Vfc+Vb+\alpha$, the first semiconductor switching element is turned on and the second, third and fourth semiconductor switching elements are turned off; in response to a condition of $Vfc<Va/2$, $Va>Va^*$, and $Va\leq Vfc+Vb+\alpha$, the first and second semiconductor switching elements are turned on and the third and fourth semiconductor switching elements are turned off, and thereafter the first semiconductor switching element is turned on and the second, third and fourth semiconductor switching elements are turned off; in response to a condition of $Vfc<Va/2$, $Va\leq Va^*$, and $Vb>Vfc+\alpha$, the fourth semiconductor switching element is turned on and the first, second and third semiconductor switching elements are turned off; in response to a condition of $Vfc<Va/2$, $Va\leq Va^*$, and $Vb\leq Vfc+

α, the third and fourth semiconductor switching elements are turned on and the first and second semiconductor switching elements are turned off, and thereafter the fourth semiconductor switching element is turned on and the first, second and third semiconductor switching elements are turned off; in response to a condition of Vfc≥Va/2 and Va>Va*, the first to fourth semiconductor switching elements are maintained off; in response to a condition of Vfc≥Va/2, Va≤Va*, and Vfc+Vb>Va+α, the third semiconductor switching element is turned on and the first, second and fourth semiconductor switching elements are turned off; in response to a condition of Vfc≥Va/2, Va≤Va*, and Vfc+Vb≤Va+α, the third and fourth semiconductor switching elements are turned on and the first and second semiconductor switching elements are turned off, and thereafter the third semiconductor switching element is turned on and the first, second and fourth semiconductor switching elements are turned off; Vfc represents the voltage of the flying capacitor; Va represents the voltage of the higher voltage side filter capacitor; Vb represents the voltage of the lower voltage side filter capacitor; Va* represents the filter capacitor voltage command value for the higher voltage side filter capacitor; and a represents a predetermined value.

According to another aspect, the FC-type three-level power conversion device is configured such that α=0.

According to another aspect, the FC-type three-level power conversion device is configured such that α>0.

According to another aspect, the FC-type three-level power conversion device is configured such that: the first to eighth semiconductor switching elements are turned on and off in accordance with a switching pattern defined in a first table, when a first mathematical expression is satisfied; the first to eighth semiconductor switching elements are turned on and off in accordance with a switching pattern defined in a second table, when a second mathematical expression is satisfied in addition to a condition that the first mathematical expression is unsatisfied or all of the first mathematical expression and conditions for selection in the first table are not simultaneously satisfied; the first to eighth semiconductor switching elements are turned on and off in accordance with a switching pattern defined in a third table, when the first mathematical expression is unsatisfied, the second mathematical expression is unsatisfied, and a third mathematical expression is satisfied; the first to eighth semiconductor switching elements are turned off, when all of the first to third mathematical expressions are unsatisfied;

the first mathematical expression is as follows:

$$(Vfc1 < Vdc/2) \text{ AND } (Vfc2 < Vdc/2); \qquad (1)$$

the first table is as follows:

| NO | CONDITIONS FOR SWITCHING PATTERN SELECTION | T1 | T2 | T3 | T4 | T5 | T6 | T7 | T8 |
|---|---|---|---|---|---|---|---|---|---|
| 1 | ((Vc < Vc*) AND (Vfc1 + Vfc2 + Vc* < Vdc)) | ON | OFF | OFF | OFF | OFF | OFF | OFF | ON |
| 2 | ((Vc > Vc*) AND (Vfc1 + Vfc2 − Vc* < Vdc)) | OFF | OFF | OFF | ON | ON | OFF | OFF | OFF; | the second mathematical expression is as follows:

$$(\text{MIN}(Vfc1, Vfc2) < Vdc/2); \qquad (2)$$

the second table is as follows:

| NO | CONDITIONS FOR SWITCHING PATTERN SELECTION | T1 | T2 | T3 | T4 | T5 | T6 | T7 | T8 |
|---|---|---|---|---|---|---|---|---|---|
| 3 | (Vfc1 < Vfc2) AND (Vfc1 < Vc) | OFF | OFF | OFF | ON | OFF | OFF | OFF | OFF |
| 4 | (Vfc1 < Vfc2) AND (Vc < Vc*) AND (Vfc1 > Vc) | ON | OFF | OFF | OFF | OFF | OFF | ON | ON |
| 5 | (Vfc1 < Vfc2) AND (Vc > Vc*) AND (Vfc1 > Vc) | OFF | OFF | OFF | ON | ON | ON | OFF | OFF |
| 6 | (Vfc1 > Vfc2) AND (Vfc2 < Vc) | OFF | OFF | OFF | OFF | ON | OFF | OFF | OFF |
| 7 | (Vfc1 > Vfc2) AND (Vfc2 > Vc) AND (Vc < Vc*) | ON | ON | OFF | OFF | OFF | OFF | OFF | ON |
| 8 | (Vfc1 > Vfc2) AND (Vfc2 > Vc) AND (Vc > Vc*) | OFF | OFF | ON | ON | ON | OFF | OFF | OFF; | the third mathematical expression is as follows:

$$(Vc < Vc^*); \qquad (3)$$

the third table is as follows:

| NO | CONDITIONS FOR SWITCHING PATTERN SELECTION | T1 | T2 | T3 | T4 | T5 | T6 | T7 | T8 |
|---|---|---|---|---|---|---|---|---|---|
| 9 | (Vc < MAX (Vfc1, Vfc2)) AND (Vfc1 > Vfc2) | OFF | ON | OFF | OFF | OFF | OFF | ON | ON |

| NO | CONDITIONS FOR SWITCHING PATTERN SELECTION | T1 | T2 | T3 | T4 | T5 | T6 | T7 | T8 |
|---|---|---|---|---|---|---|---|---|---|
| 10 | (Vc < MAX (Vfc1, Vfc2) ) AND (Vfc1 < Vfc2) | ON | ON | OFF | OFF | OFF | OFF | ON | OFF |
| 11 | (Vc > MAX (Vfc1, Vfc2) ) | ON | ON | OFF | OFF | OFF | OFF | ON | ON; |

Vfc1 represents the voltage of the first flying capacitor; Vfc2 represents the voltage of the second flying capacitor; Vdc represents the voltage of the direct current voltage source; Vc represents the voltage of the filter capacitor; Vc* represents the filter capacitor voltage command value; and T1-T8 represent the first to eighth semiconductor switching elements.

According to another aspect, the FC-type three-level power conversion device includes: first to Nth units, wherein N represents an integer greater than or equal to three, each including: first to fourth semiconductor switching elements connected in series between the positive electrode and the negative electrode of the direct current voltage source, and arranged in this order from the positive electrode to the negative electrode; and a flying capacitor connected between a node between the first and second semiconductor switching elements and a node between the third and fourth semiconductor switching elements; first to Nth filter reactors each including a first end connected to a node between the second and third semiconductor switching elements of a corresponding one of the units; filter capacitors each connected between second ends of corresponding two of the filter reactors opposite to the first ends of the corresponding two of the filter reactors; the first unit is one of the units whose flying capacitor is lowermost in voltage; the second unit is one of the units whose flying capacitor is second lowermost in voltage; the first filter reactor is one of the filter reactors whose first end is connected to the first unit; the second filter reactor is one of the filter reactors whose first end is connected to the second unit; and Vc represents the voltage of the filter capacitor connected between the second end of the first filter reactor and the second end of the second filter reactor.

According to the present invention, it is possible in an FC-type three-level power conversion device to charge both a flying capacitor and a filter capacitor without outputting an electric current to the outside of the device.

MODE(S) FOR CARRYING OUT INVENTION

The following describes FC-type three-level power conversion devices according to first to seventh embodiments of to the present invention in detail with reference to FIGS. 1 to 20.

Figure 1:
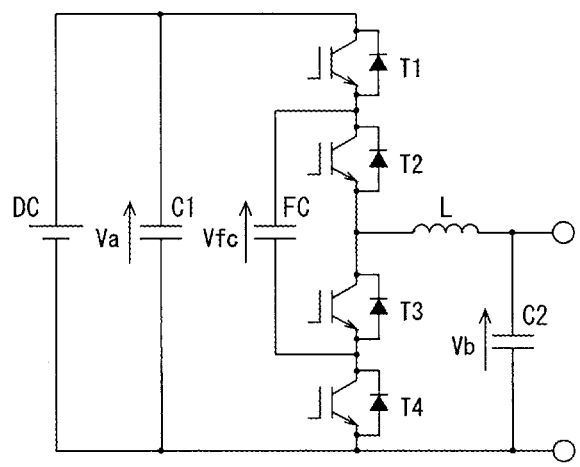
FIG. 1 is a circuit diagram showing an FC-type three-level power conversion device according to a first embodiment.

[First Embodiment] FIG. 1 shows circuit configuration of an FC-type three-level power conversion device (FC-type three-level chopper circuit) according to the first embodiment. A higher voltage side filter capacitor C1 is connected in parallel with a direct current voltage source DC. First to fourth semiconductor switching elements T1 to T4 are connected in series between a positive electrode and a negative electrode of the higher voltage side filter capacitor C1, and arranged in this order from the positive electrode to the negative electrode. A flying capacitor FC is connected between a node between the first and second semiconductor switching elements T1 and T2 and a node between the third and fourth semiconductor switching elements T3 and T4.

A first end of a filter reactor L is connected to a node between the second and third semiconductor switching elements T2 and T3. A lower voltage side filter capacitor C2 is connected between the negative electrode of the higher voltage side filter capacitor C1 and a second end of the filter reactor L opposite to the first end of the filter reactor L. A node between the filter reactor L and the lower voltage side filter capacitor C2 serves as an output terminal, whereas the negative electrode of the direct current voltage source DC serves as another output terminal.

Va represents voltage of the higher voltage side filter capacitor, Vb represents voltage of the lower voltage side filter capacitor, and Vfc represents voltage of the flying capacitor. In the first embodiment, it is assumed that the direct current voltage source DC is connected to a higher voltage side, and charges the flying capacitor FC and the lower voltage side filter capacitor C2. The power conversion device, which is composed of the chopper circuit and the LC filter, is set in a state disconnected from a load.

Figure 2:
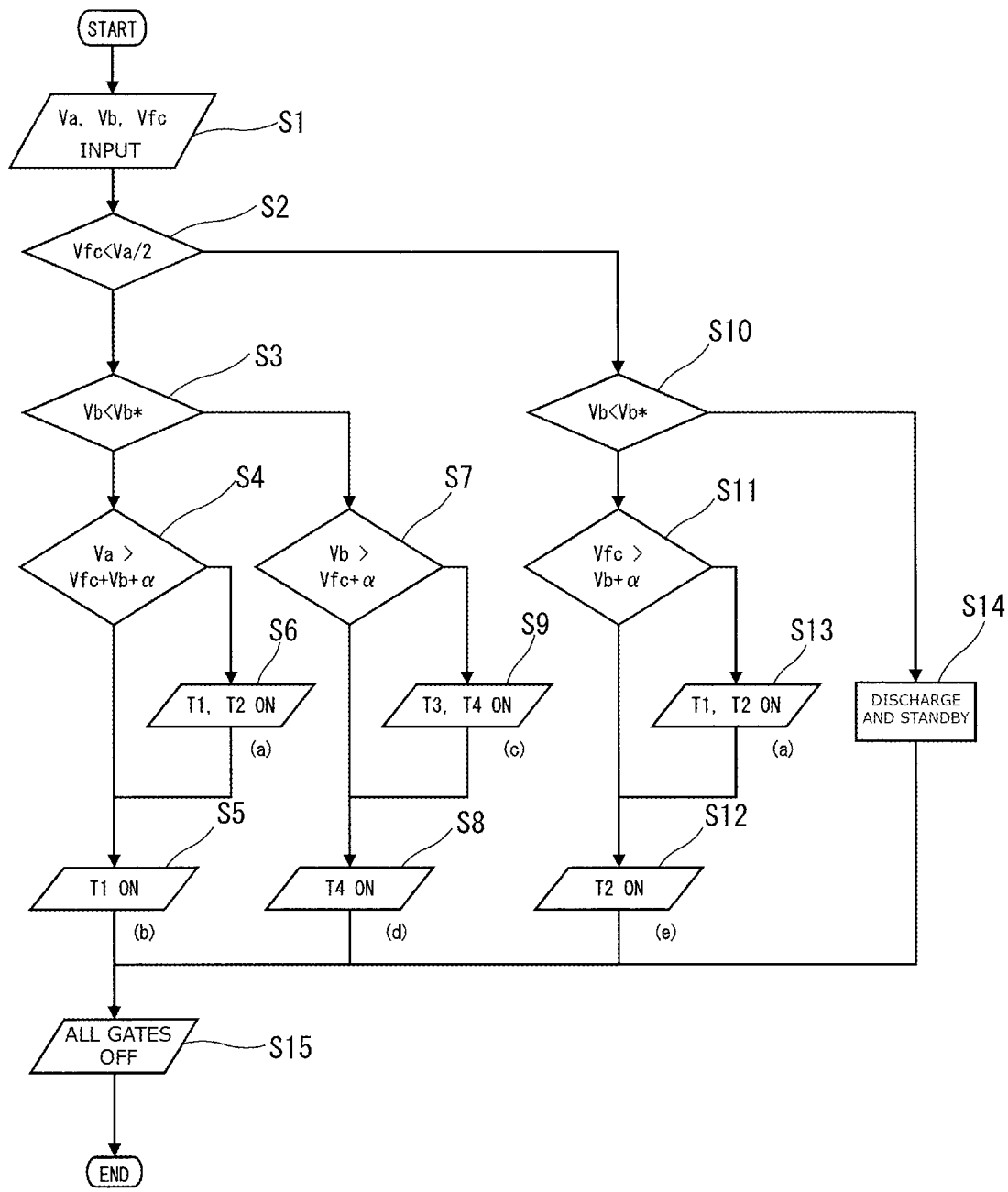
FIG. 2 is a flowchart showing a procedure of a charging process according to the first embodiment.

FIG. 2 is a flowchart showing a procedure of a charging process according to the first embodiment. At each determination in the flowchart of FIG. 2, when a condition is satisfied, the process branches down, and when the condition is unsatisfied, the process branches right. In the first embodiment, a predetermined value α is set as α=0 in each determination. The predetermined value α is detailed below. In the first embodiment, the flying capacitor FC and the lower voltage side filter capacitor C2 are charged by the following procedure (S1 to S15).

At S1, the direct current voltage source voltage (=higher voltage side filter capacitor voltage) Va, the lower voltage side filter capacitor voltage Vb, and the flying capacitor voltage Vfc are sensed. At S2, the flying capacitor voltage Vfc is compared with Va/2 that is ½ of the direct current voltage source voltage (=higher voltage side filter capacitor voltage) Va.

In case of Vfc<Va/2, namely, when it is required to charge the flying capacitor FC, the process proceeds to S3 where the lower voltage side filter capacitor voltage Vb is compared with a filter capacitor voltage command value Vb*.

In case of Vb<Vb*, namely, when it is required to charge both the flying capacitor FC and the lower voltage side filter capacitor C2, the process proceeds to S4 where the direct current voltage source voltage (higher voltage side filter capacitor voltage) Va is compared with Vfc+Vb.

In case of Va>Vfc+Vb, the process proceeds to S5 where the first semiconductor switching element T1 is turned on. In case of Va≤Vfc+Vb, the process proceeds to S6 where the first semiconductor switching element T1 and the second semiconductor switching element T2 are turned on, and thereafter the process proceeds to S5 where the second semiconductor switching element T2 is turned off and only the first semiconductor switching element T1 is turned on.

At S3, in case of Vb≥Vb*, namely, when it is required to charge only the flying capacitor FC, the process proceeds to S7 where the lower voltage side filter capacitor voltage Vb is compared with the flying capacitor voltage Vfc.

In case of Vb>Vfc, the process proceeds to S8 where the fourth semiconductor switching element T4 is turned on. In case of Vb≤Vfc, the process proceeds to S9 where the third semiconductor switching element T3 and the fourth semiconductor switching element T4 are turned on, and thereafter the process proceeds to S8 where the third semiconductor switching element T3 is turned off and only the fourth semiconductor switching element T4 is turned on.

At S2, in case of Vfc≥Va/2, namely, when it is not required to charge the flying capacitor FC, the process proceeds to S10 where the lower voltage side filter capacitor voltage Vb is compared with the filter capacitor voltage command value Vb*.

In case of Vb<Vb*, namely, when it is required to charge only the lower voltage side filter capacitor C2, the process proceeds to S11 where the flying capacitor voltage Vfc is compared with the lower voltage side filter capacitor voltage Vb.

In case of Vfc>Vb, the process proceeds to S12 where the second semiconductor switching element T2 is turned on. In case of Vfc≤Vb, the process proceeds to S13 where the first semiconductor switching element T1 and the second semiconductor switching element T2 are turned on, and thereafter the process proceeds to S12 where the first semiconductor switching element T1 is turned off and only the second semiconductor switching element T2 is turned on.

At S10, in case of Vb≥Vb*, namely, when it is required to charge none of the flying capacitor FC and the lower voltage side filter capacitor C2, the process proceeds to S14 where the first to fourth semiconductor switching elements T1 to T4 are maintained off so as to promote self-discharging.

At S15, the gate of each of all the semiconductor switching elements is turned off. A gate-on time or standby time is assumed to be short (about 10 μs). Until start of operation, the process described above is repeated at a frequency such as an interval of 1 ms where the semiconductor switching elements and the filter reactor cause no problem of thermal duty.

Figure 3:
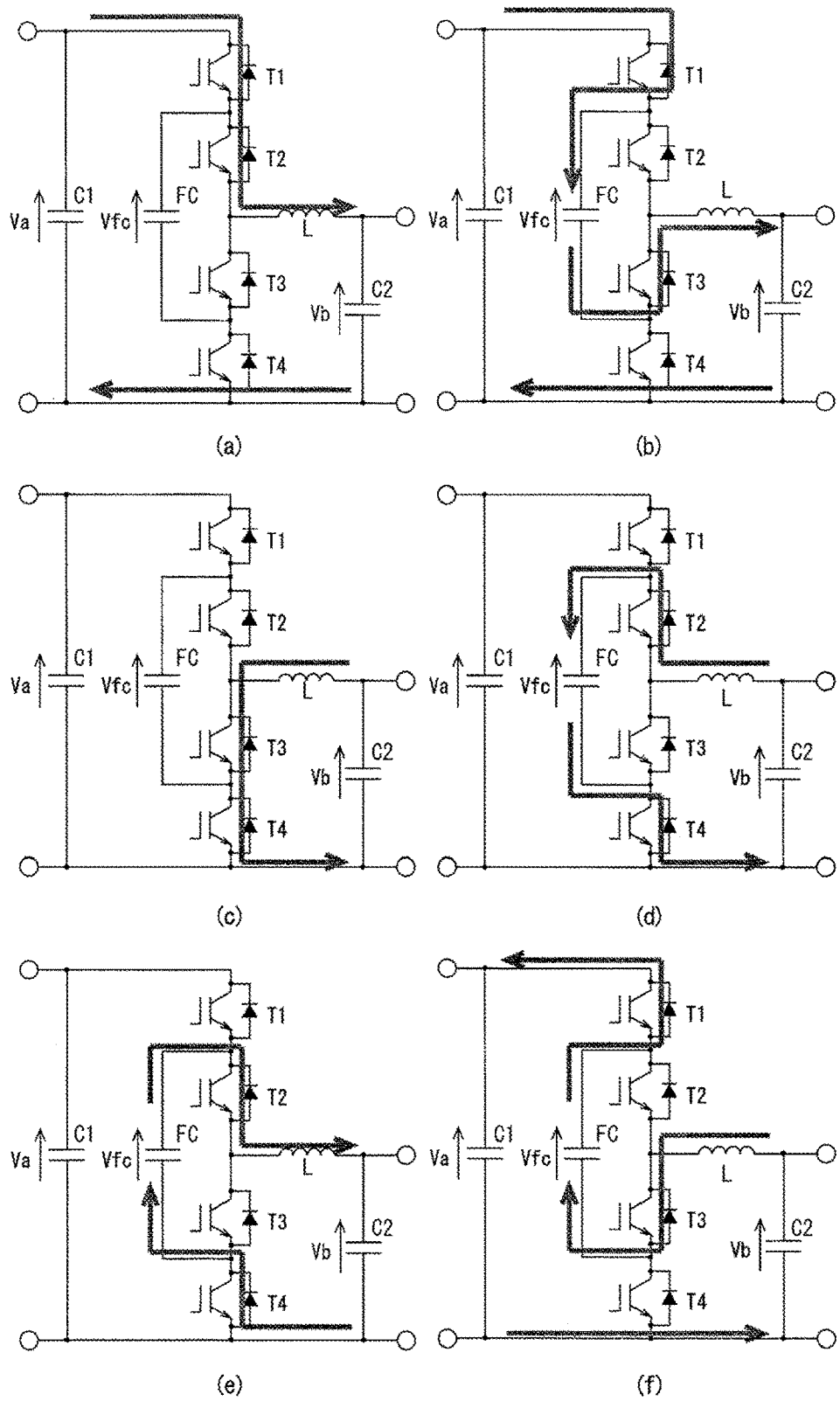
FIG. 3 is a diagram showing an electric current path by each switching pattern.

FIG. 3 shows an electric current path by each switching pattern. When both the flying capacitor FC and the lower voltage side filter capacitor C2 are to be charged, the first semiconductor switching element T1 is turned on at S5 so that an electric current flows along a path shown in FIG. 3 (b) (C1→T1→FC→T3→L→C2) to charge the flying capacitor FC and the lower voltage side filter capacitor C2.

However, when both the flying capacitor FC and the lower voltage side filter capacitor C2 are already charged to some extent and Vfc+Vb≥Va is satisfied, no electric current flows even with only the first semiconductor switching element T1 turned on. In this situation, at S6, the second semiconductor switching element T2 is also turned on so that an electric current flows along a path shown in FIG. 3 (a) (C1→T1→T2→L→C2), and at S5, only the second semiconductor switching element T2 is turned off to cause an electric current to flow along the path shown in FIG. 3 (b).

When the lower voltage side filter capacitor voltage Vb is sufficient and only the flying capacitor FC is to be charged, and Vb>Vfc is satisfied, the fourth semiconductor switching element T4 is turned on at S8 so that an electric current flows along a path shown in FIG. 3 (d) (C2→L→T2→FC→T4) to charge the flying capacitor FC from the lower voltage side filter capacitor C2.

In case of Vb≤Vfc, no electric current flows even with only the fourth semiconductor switching element T4 turned on. Accordingly, at S9, the third semiconductor switching element T3 is also turned on so that an electric current flows along a path shown in FIG. 3 (c) (C2→L→T3→T4), and thereafter, at S8, only the third semiconductor switching element T3 is turned off so that an electric current flows along the path shown in FIG. 3 (d).

When the flying capacitor voltage Vfc is sufficient and only the lower voltage side filter capacitor C2 is to be charged, and Vfc>Vb is satisfied, the second semiconductor switching element T2 is turned on at S12 so that an electric current flows along a path shown in FIG. 3 (e) (FC→T2→L→C2→T4) so as to charge the lower voltage side filter capacitor C2 from the flying capacitor FC.

In case of Vfc≤Vb, no electric current flows even with only the second semiconductor switching element T2 turned on. Accordingly, at S13, the first semiconductor switching element T1 is also turned on so that an electric current flows along the path shown in FIG. 3 (a) (C1→T1→T2→L→C2), and thereafter, at S12, only the first semiconductor switching element T1 is turned off so that an electric current flows along the path shown in FIG. 3 (e).

When the voltage of the flying capacitor FC and the voltage of the lower voltage side filter capacitor C2 are both sufficiently high, the gate of each of all the semiconductor switching elements is maintained off at S14 so as to set the device in a standby state while promoting self-discharging.

By repeating the above process at predetermined intervals, the flying capacitor voltage Vfc can be charged to Va/2, and the lower voltage side filter capacitor voltage Vb can be charged to the filter capacitor voltage command value Vb*.

As discussed above, according to the first embodiment, it is possible in the FC-type three-level power conversion device (FC-type three-level chopper circuit) to charge the flying capacitor FC and the lower voltage side filter capacitor C2 from the high voltage side.

Since the charging can be performed with no load connected, it is not required to cause an electric current to flow through a load, and it is possible to prevent an inrush current when the load is connected. The first embodiment may be applied with a load connected, where the current flowing through the load can be minimized by shortening the gate-on time.

In the first embodiment, the flying capacitor FC and the lower voltage side filter capacitor C2 can be charged without preparing a separate pre-charging circuit.

Figure 4:
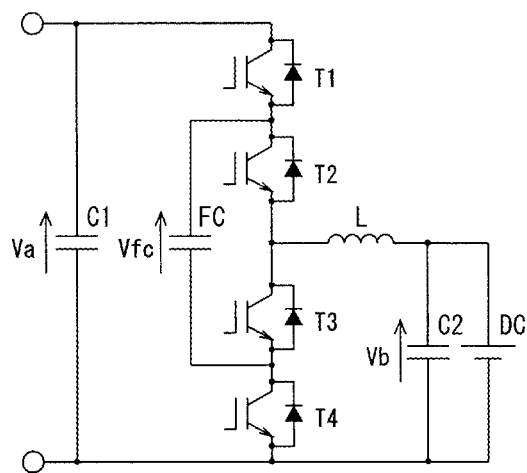
FIG. 4 is a circuit diagram showing an FC-type three-level power conversion device according to a second embodiment.

[Second Embodiment] FIG. 4 shows circuit configuration of an FC-type three-level power conversion device (FC-type three-level chopper circuit) according to the second embodiment. In the second embodiment, a direct current voltage source DC is connected in parallel with a lower voltage side filter capacitor C2, where the direct current voltage source DC connected in parallel with the higher voltage side filter capacitor C1 is removed. Others are the same as in the first embodiment (FIG. 1). In the second embodiment, it is assumed that the flying capacitor FC and the higher voltage side filter capacitor C1 are charged by the direct current voltage source DC. Also in the second embodiment, no load is connected.

Figure 5:
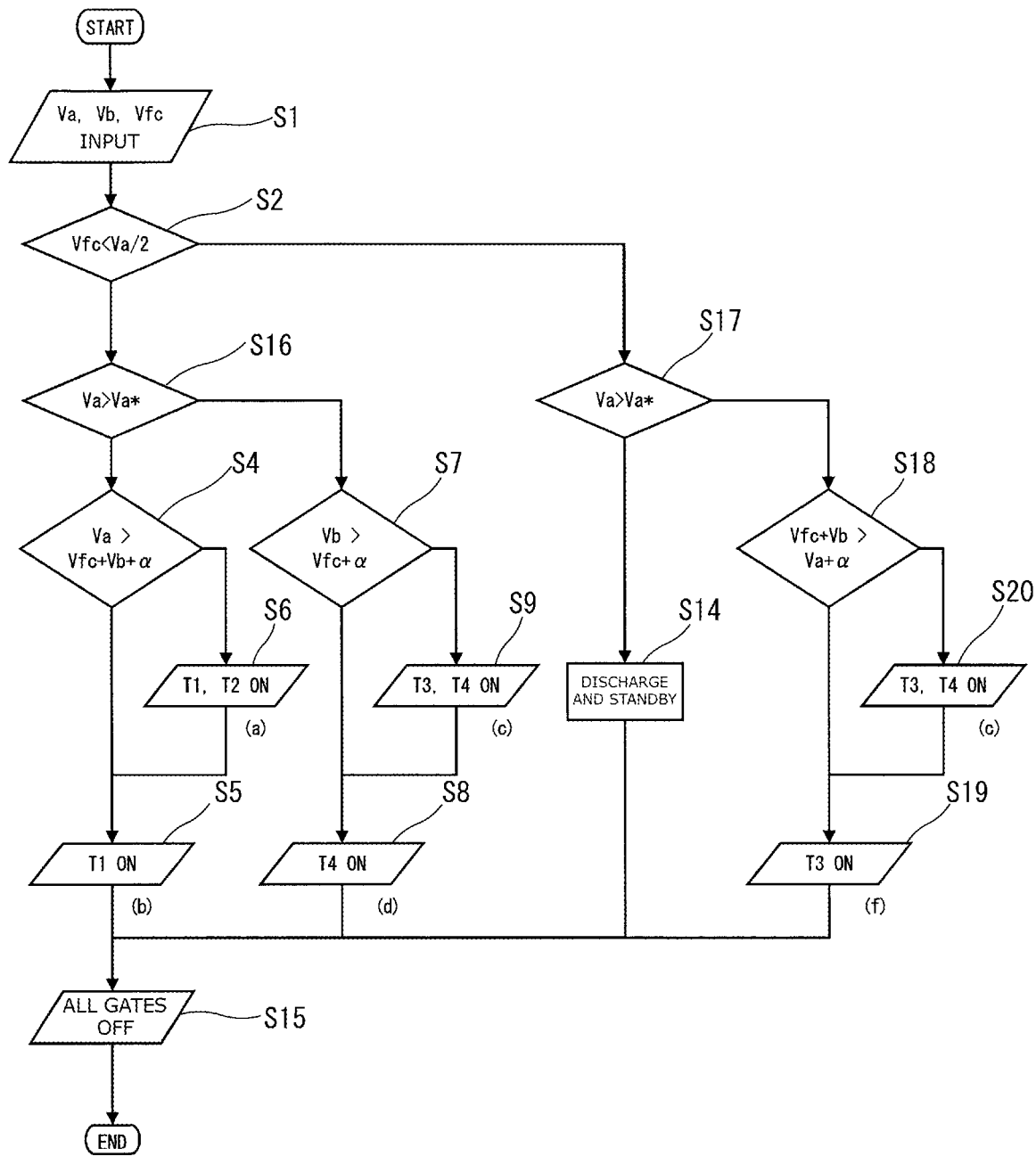
FIG. 5 is a flowchart showing a procedure of a charging process according to the second embodiment.

FIG. 5 shows a flowchart according to the second embodiment. Also in the second embodiment, a predetermined value α is set as α=0 in each determination. In the second embodiment, the flying capacitor FC and the higher voltage side filter capacitor C1 are charged by the following procedure (S1, S2, S4 to S9, and S14 to S20).

At S1, the higher voltage side filter capacitor voltage Va, the direct current voltage source voltage (=lower voltage side filter capacitor voltage) Vb, and the flying capacitor voltage Vfc are sensed. At S2, the flying capacitor voltage Vfc is compared with Va/2 that is ½ of the higher voltage side filter capacitor voltage Va.

In case of Vfc<Va/2, namely, when it is required to charge the flying capacitor FC, the process proceeds to S16 where the higher voltage side filter capacitor voltage Va is compared with a filter capacitor voltage command value Va*.

In case of Va>Va*, namely, when it is required to charge only the flying capacitor FC, the process proceeds to S4 where the higher voltage side filter capacitor voltage Va is compared with Vfc+Vb. In case of Va>Vfc+Vb, the process proceeds to S5 where the first semiconductor switching element T1 is turned on.

In case of Va≤Vfc+Vb, the process proceeds to S6 where the first semiconductor switching element T1 and the second semiconductor switching element T2 are turned on, and thereafter the process proceeds to S5 where the second semiconductor switching element T2 is turned off and only the first semiconductor switching element T1 is turned on.

In case of Va≤Va*, namely, when it is required to charge both the flying capacitor FC and the higher voltage side filter capacitor C1, the process proceeds to S7 where the direct current voltage source voltage (=lower voltage side filter capacitor voltage) Vb is compared with the flying capacitor voltage Vfc.

In case of Vb>Vfc, the process proceeds to S8 where the fourth semiconductor switching element T4 is turned on. In case of Vb≤Vfc, the process proceeds to S9 where the third semiconductor switching element T3 and the fourth semiconductor switching element T4 are turned on, and thereafter the process proceeds to S8 where the third semiconductor switching element T3 is turned off and only the fourth semiconductor switching element T4 is turned on.

At S2, in case of Vfc≥Va/2, namely, when charging of the flying capacitor FC is unrequired, the process proceeds to S17 where the higher voltage side filter capacitor voltage Va is compared with the filter capacitor voltage command value Va*. In case of Va>Va*, namely, when charging of the flying capacitor FC and charging of the higher voltage side filter capacitor C1 are both unrequired, the process proceeds to S14 where the first to fourth semiconductor switching elements T1 to T4 are maintained off to promote self-discharging.

In case of Va≤Va*, namely, when it is required to charge only the higher voltage side filter capacitor C1, the process proceeds to S18 where Vfc+Vb is compared with the higher voltage side filter capacitor voltage Va.

In case of Vfc+Vb>Va, the process proceeds to S19 where the third semiconductor switching element T3 is turned on. In case of Vfc+Vb≤Va, the process proceeds to S20 where the third semiconductor switching element T3 and the fourth semiconductor switching element T4 are turned on, and thereafter the process proceeds to S19 where the fourth semiconductor switching element T4 is turned off and only the third semiconductor switching element T3 is turned on.

Finally, the process proceeds to S15 where the gate of each of all the semiconductor switching elements is turned off.

The second embodiment is also based on the assumption that the gate-on time or standby time is short (about 10 μs). The above process is repeated until start of operation. In the second embodiment, it is required to charge the higher voltage side filter capacitor voltage Va to the direct current voltage source voltage (lower voltage side filter capacitor voltage) Vb in advance by using a pre-charging circuit or the like.

The conditions for switching pattern selection according to the second embodiment are set by replacing "Vb<Vb* (when the lower voltage side filter capacitor C2 is to be charged)" at S3 and S10 in the first embodiment with "Va>Va* (when the higher voltage side filter capacitor C1 is to be discharged) at S16 and S17. Namely, in the flowchart of FIG. 5, it is sufficient to change the direction of the inequality sign in the second determination.

However, "when both the flying capacitor voltage Vfc and the filter capacitor voltage Vb are sufficiently high (S14)" in the first embodiment corresponds to "when the flying capacitor voltage Vfc is sufficiently high but the higher voltage side filter capacitor voltage Va needs to be charged (S18)" in the second embodiment. Accordingly, at S19, the third semiconductor switching element T3 is turned on so that an electric current flows along the path shown in FIG. 3 (f) (C2→L→T3→FC→T1→C1) so as to charge the higher voltage side filter capacitor C1. When Va≥Vfc+Vb is satisfied and no electric current flows even with only the third semiconductor switching element T3 turned on, at S20, the fourth semiconductor switching element T4 is also turned on so that an electric current flows along the path shown in FIG. 3 (c), and thereafter, at S19, the fourth semiconductor switching element T4 is turned off so that an electric current flows along the path shown in FIG. 3 (f).

On the other hand, "when the flying capacitor voltage Vfc is sufficient but the lower voltage side filter capacitor voltage Vb needs to be charged (in case of Yes at S10)" in the first embodiment corresponds to "when the flying capacitor voltage Vfc and the higher voltage side filter capacitor voltage Va are both sufficiently high (in case of Yes at S17)" in the second embodiment. Accordingly, the gate of each of all the semiconductor switching elements is maintained off to shift into a standby state while promoting self-discharging and (S14).

As discussed above, according to the second embodiment, it is possible in the FC-type three-level power conversion device (FC-type three-level chopper circuit) to charge the flying capacitor FC and the higher voltage side filter capacitor C1 from the low voltage side. Other effects are the same as in the first embodiment, but the second embodiment requires a pre-charging circuit for the higher voltage side filter capacitor C1. For the flying capacitor FC, no pre-charging circuit is required.

Figure 6:
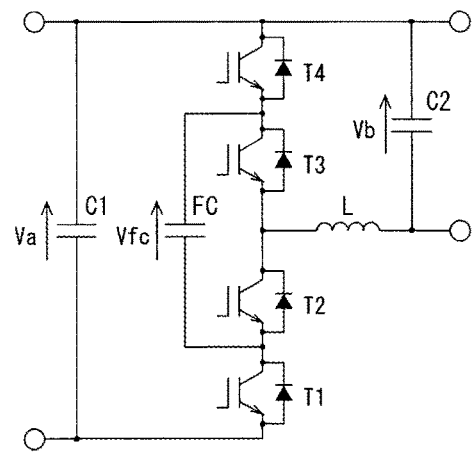
FIG. 6 is a circuit diagram showing an FC-type three-level power conversion device according to a third embodiment.

[Third Embodiment] FIG. 6 shows a circuit configuration according to the third embodiment. The third embodiment is configured such that a positive electrode side of a higher voltage side filter capacitor C1 and a positive electrode side of a lower voltage side filter capacitor C2 have a common potential. Semiconductor switching elements include a fourth semiconductor switching element T4, a third semiconductor switching element T3, a second semiconductor switching element T2, and a first semiconductor switching element T1 arranged in this order from the positive electrode side. Others are the same as in the first embodiment or the second embodiment.

When the direct current voltage source DC is connected in parallel with the higher voltage side filter capacitor C1, the flying capacitor FC and the lower voltage side filter capacitor C2 are charged by the same procedure as in the first embodiment. When the direct current voltage source DC is connected in parallel with the lower voltage side filter capacitor C2, the flying capacitor FC and the higher voltage side filter capacitor C1 are charged by the same procedure as in the second embodiment.

In the first and second embodiments, the negative electrode side of the higher voltage side filter capacitor C1 and the negative electrode side of the lower voltage side filter capacitor C2 have a common potential. However, as shown in FIG. 6, it may be also configured such that the positive electrode sides have a common potential. In the third embodiment, also for the circuit configuration of FIG. 6, with the changed order of connection of the semiconductor switching elements, the flying capacitor FC and the higher voltage side filter capacitor C1 or the lower voltage side filter capacitor C2 can be charged and discharged by exactly the same procedure as in the first and second embodiments.

As described above, the third embodiment can produce the same effects as the first and second embodiments also in the FC-type three-level power conversion device (FC-type three-level chopper circuit) in which the positive electrode sides have a common potential.

[Fourth Embodiment] In the fourth embodiment, the predetermined value α is set as α>0 in each voltage comparison (S4, S7, S11, S18) in the flowcharts of FIGS. 2 and 5.

For example, in the first embodiment, in case of Vfc<Va/2 (the flying capacitor FC is to be charged) and Vb<Vb* (the lower voltage side filter capacitor C2 is to be charged), only the first semiconductor switching element T1 is turned on when Va>Vfc+Vb is satisfied.

However, when both values are very close to each other, the voltage Va−Vfc−Vb>0 applied to the filter reactor L is larger than zero but very small, so that a charging current flows but charging takes time. To prevent this, the predetermined value α is set as α>0. This serves to ensure that the voltage Va−Vfc−Vb applied to the filter reactor L is set larger than the predetermined value α.

When Va>Vfc+Vb+α is unsatisfied, the first semiconductor switching element T1 and the second semiconductor switching element T2 are both turned on so that the voltage applied to the filter reactor L becomes equal to Va−Vb, and a large charging current flows to complete the charging with a short time.

As a guideline for the predetermined value α, the predetermined value α is set to about 10% to 30% of a rated value (withstand voltage value) of the higher voltage side filter capacitor voltage, although it depends on the size of the filter reactor L. The predetermined value α may be variable such that immediately after the device is started up, the predetermined value α is increased to shorten the time until charging is completed, and once charging of the flying capacitor FC and the higher voltage side filter capacitor C1 or the lower voltage side filter capacitor C2 is completed, the predetermined value α is reduced to reduce the charging current, improve the accuracy of voltage control, and reduce the thermal duty of the components of the device.

As described above, according to the fourth embodiment, it is possible to shorten the time required for charging the flying capacitor FC and the filter capacitor C.

[Fifth Embodiment] The following describes methods according to the fifth to seventh embodiments in which in an FC-type three-level power conversion device (FC-type three-level conversion device) having an LC filter capable of differential output, first and second flying capacitors FC1, FC2 and a filter capacitor C2 are charged and maintained charged when in a "standby" state, by turning on and off semiconductor switching elements in accordance with the state of charge of each of a direct current voltage source DC, the first and second flying capacitors FC1, FC2, and the filter capacitor C2.

Figure 7:
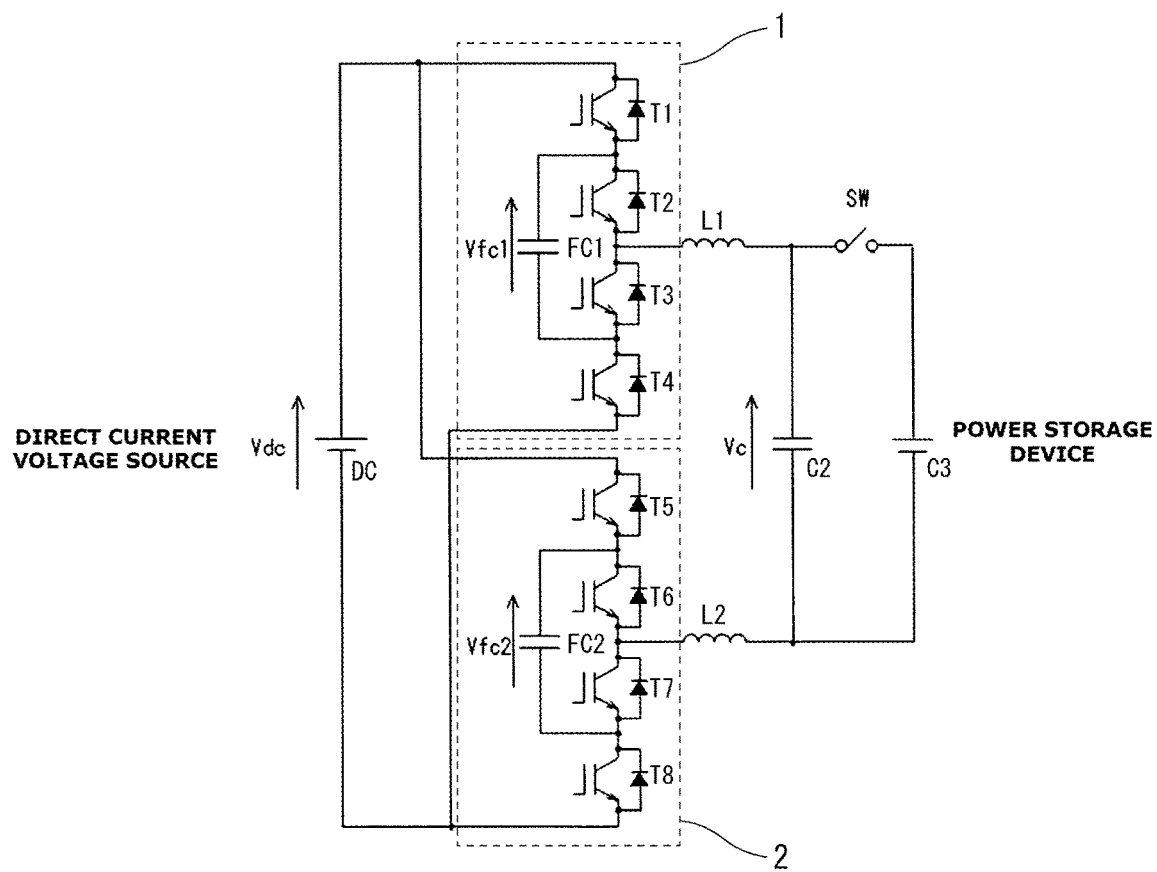
FIG. 7 is a circuit diagram showing an FC-type three-level power conversion device according to a fifth embodiment.

FIG. 7 shows a schematic view of the FC-type three-level power conversion device (FC-type three-level conversion device) according to the fifth embodiment. In FIG. 7, the load is a power storage device C3. First, the following describes the FC-type three-level power conversion device (FC-type three-level conversion device) shown in FIG. 7.

As shown in FIG. 7, a first unit 1 and a second unit 2 are connected to the direct current voltage source DC. In the first unit 1, first to fourth semiconductor switching elements T1 to T4 are connected in series between the positive electrode and the negative electrode of the direct current voltage source DC, and arranged in this order from the positive electrode to the negative electrode. A first flying capacitor FC1 is connected between a node between the first and second semiconductor switching elements T1 and T2 and a node between the third and fourth semiconductor switching elements T3 and T4. A node between the second and third semiconductor switching elements T2 and T3 serves as an output terminal of the first unit 1.

In the second unit 2, fifth to eighth semiconductor switching elements T5 to T8 are connected in series between the positive electrode and the negative electrode of the direct current voltage source DC, and arranged in this order from the positive electrode to the negative electrode. A second flying capacitor FC2 is connected between a node between the fifth and sixth semiconductor switching elements T5 and T6 and a node between the seventh and eighth semiconductor switching elements T7 and T8. A node between the sixth and seventh semiconductor switching elements T6 and T7 serves as an output terminal of the second unit.

The output terminal of the first unit 1 and the output terminal of the second unit 2 are connected to a first end of a first filter reactor L1 and a first end of a second filter reactor L2, respectively. A filter capacitor C2 is connected between a second end of the first filter reactor L1 opposite to the first end of the first filter reactor L1 and a second end of the second filter reactor L2 opposite to the first end of the second filter reactor L2. The power storage device C3 is connected in parallel with the filter capacitor C2. A switch SW is connected between the filter capacitor C2 and the power storage device C3.

When all the semiconductor switching elements are off, the switch SW is opened to disconnect the power storage device C3 from the FC-type three-level power conversion device. A filter capacitor voltage command value Vc* of the filter capacitor C2 is set so as to match a voltage value of the power storage device C3. In the fifth embodiment, Vc* is set as Vc*≥0.

When the following conditional expression (1) is satisfied, namely, when charging of the first and second flying capacitors FC1 and FC2 is required, the first and second flying capacitors FC1 and FC1 are charged simultaneously from the direct current voltage source DC. Each semiconductor switching element is turned on and off by a switching pattern according to Table 1 below.

[Mathematical Expression 1]

$$(Vfc1 < Vdc/2) \text{ AND } (Vfc2 < Vdc/2)) \tag{1}$$

TABLE 1

| NO | CONDITIONS FOR SWITCHING PATTERN SELECTION | T1 | T2 | T3 | T4 | T5 | T6 | T7 | T8 |
|---|---|---|---|---|---|---|---|---|---|
| 1 | ((Vc < Vc* ) AND (Vfc1 + Vfc2 + Vc* < Vdc )) | ON | OFF | OFF | OFF | OFF | OFF | OFF | ON |
| 2 | ((Vc > Vc* ) AND (Vfc1 + Vfc2 − Vc* < Vdc )) | OFF | OFF | OFF | ON | ON | OFF | OFF | OFF |

In Table 1, Vc represents voltage of the filter capacitor, Vfc1 represents voltage of the first flying capacitor, Vfc2 represents voltage of the second flying capacitor, and Vdc represents voltage of the direct current voltage source.

Figure 8:
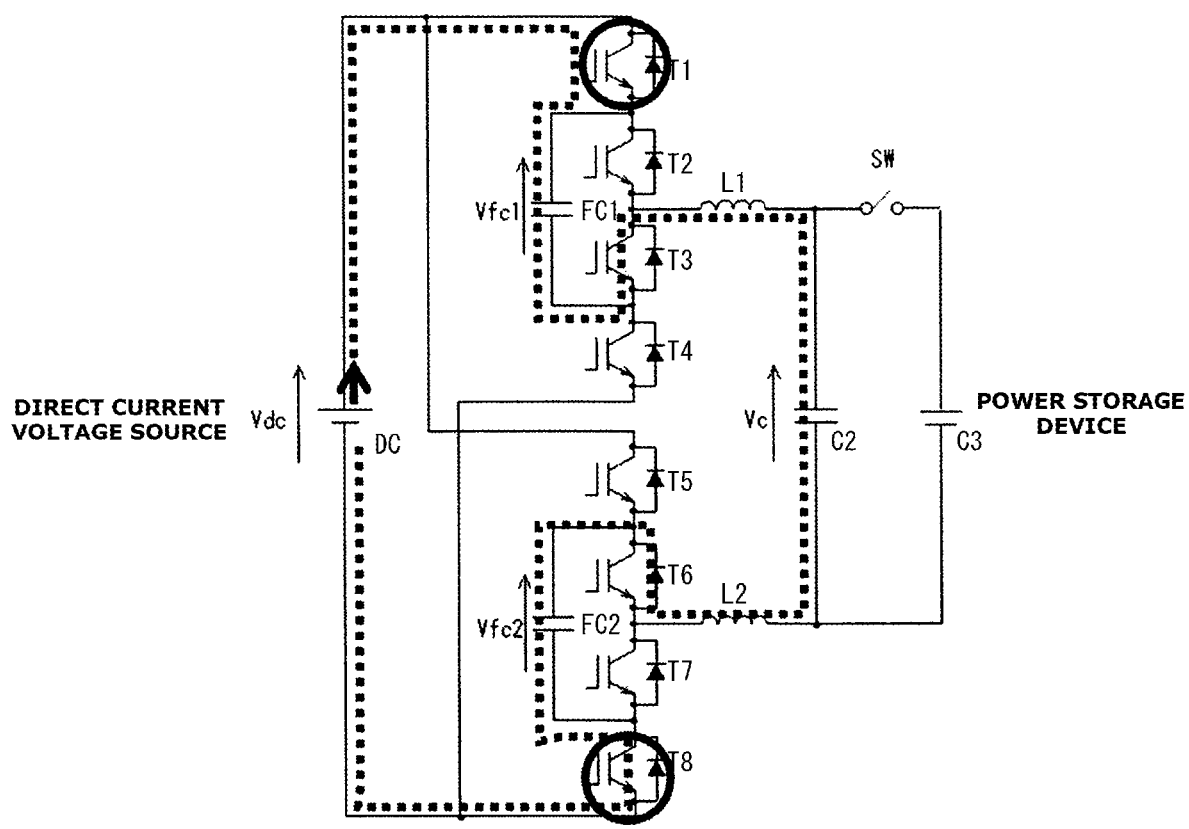
FIG. 8 is a diagram showing an electric current path by a switching pattern according to the fifth embodiment (No. 1).
Figure 9:
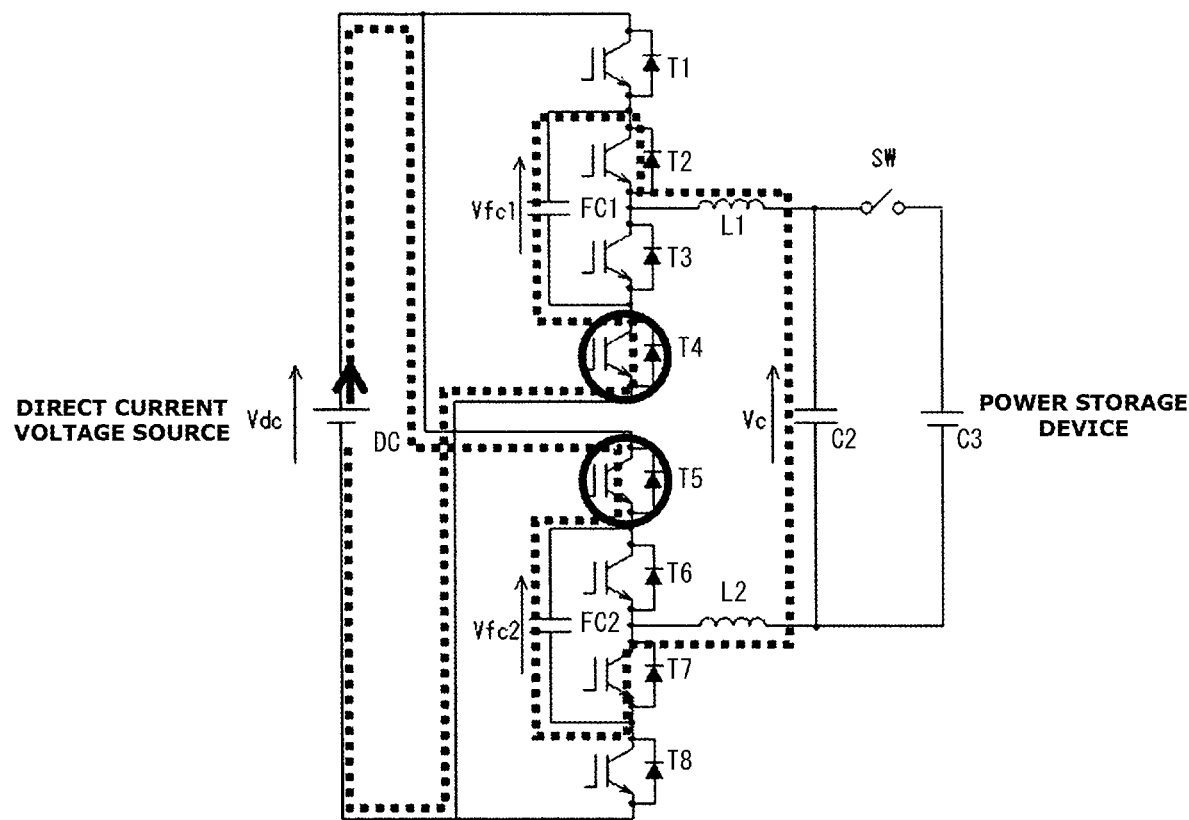
FIG. 9 is a diagram showing an electric current path by a switching pattern according to the fifth embodiment (No. 2).

A switching pattern for No. 1 in Table 1 is shown in FIG. 8. A switching pattern for No. 2 in Table 1 is shown in FIG. 9. As shown in FIGS. 8 and 9, each circle indicates that the circled semiconductor switching element is in on state. Broken lines represent the direction that an electric current flows, and an arrow indicates a positive direction.

In case of FIG. 8, an electric current flows along a path of DC→T1→FC1→T3→L1→C2→L2→T6→FC2→T8. In case of FIG. 9, an electric current flows along a path of DC→T5→FC2→T7→L2→C2→L1→T2→FC1→T4.

As a result, the first flying capacitor FC1 and the second flying capacitor FC2 are charged, whereas the filter capacitor C2 is charged in case of No. 1 in Table 1 (FIG. 8) and discharged in case of No. 2 in Table 1 (FIG. 9).

When the conditional expression (1) is unsatisfied, or the conditional expression (1) is satisfied but the selection conditions in Table 1 are unsatisfied, in addition to satisfaction of the following conditional expression (2), namely, when only one of the first and second flying capacitors FC1 and FC2 needs to be charged, or the voltages of the first and second flying capacitors FC1 and FC2 and the filter capacitor C2 are below command values, but the total voltage of the first and second flying capacitors FC1 and FC2 and the filter capacitor C2 is higher than the direct current voltage Vdc so that the first and second flying capacitors FC1 and FC2 cannot be charged simultaneously, one of the first flying capacitor FC1 and the second flying capacitor FC2 which is lower in voltage value is charged from the direct current voltage source DC or the filter capacitor C2.

[Mathematical Expression 2]

$$(\text{MIN}(Vfc1, Vfc2) < Vdc/2) \tag{2}$$

Each semiconductor switching element is turned on and off by a switching pattern according to Table 2 below.

TABLE 2

| NO | CONDITIONS FOR SWITCHING PATTERN SELECTION | T1 | T2 | T3 | T4 | T5 | T6 | T7 | T8 |
|---|---|---|---|---|---|---|---|---|---|
| 3 | (Vfc1 < Vfc2) AND (Vfc1 < Vc) | OFF | OFF | OFF | ON | OFF | OFF | OFF | OFF |

TABLE 2-continued

| NO | CONDITIONS FOR SWITCHING PATTERN SELECTION | T1 | T2 | T3 | T4 | T5 | T6 | T7 | T8 |
|---|---|---|---|---|---|---|---|---|---|
| 4 | (Vfc1 < Vfc2) AND (Vc < Vc*) AND (Vfc1 > Vc) | ON | OFF | OFF | OFF | OFF | OFF | ON | ON |
| 5 | (Vfc1 < Vfc2) AND (Vc > Vc*) AND (Vfc1 > Vc) | OFF | OFF | OFF | ON | ON | ON | OFF | OFF |
| 6 | (Vfc1 > Vfc2) AND (Vfc2 < Vc) | OFF | OFF | OFF | OFF | ON | OFF | OFF | OFF |
| 7 | (Vfc1 > Vfc2) AND (Vfc2 > Vc) AND (Vc < Vc*) | ON | ON | OFF | OFF | OFF | OFF | OFF | ON |
| 8 | (Vfc1 > Vfc2) AND (Vfc2 > Vc) AND (Vc > Vc*) | OFF | OFF | ON | ON | ON | OFF | OFF | OFF |

Switching patterns for No. 3, No. 4, No. 5, No. 6, No. 7, and No. 8 in Table 2 are shown in FIG. 10, FIG. 11, FIG. 12, FIG. 13, FIG. 14, and FIG. 15, respectively. As shown in FIGS. 10, 11, 12, 13, 14, and 15, each circle indicates that the circled semiconductor switching element is in on state. Broken lines represent the direction that an electric current flows, and an arrow indicates a positive direction.

Figure 10:
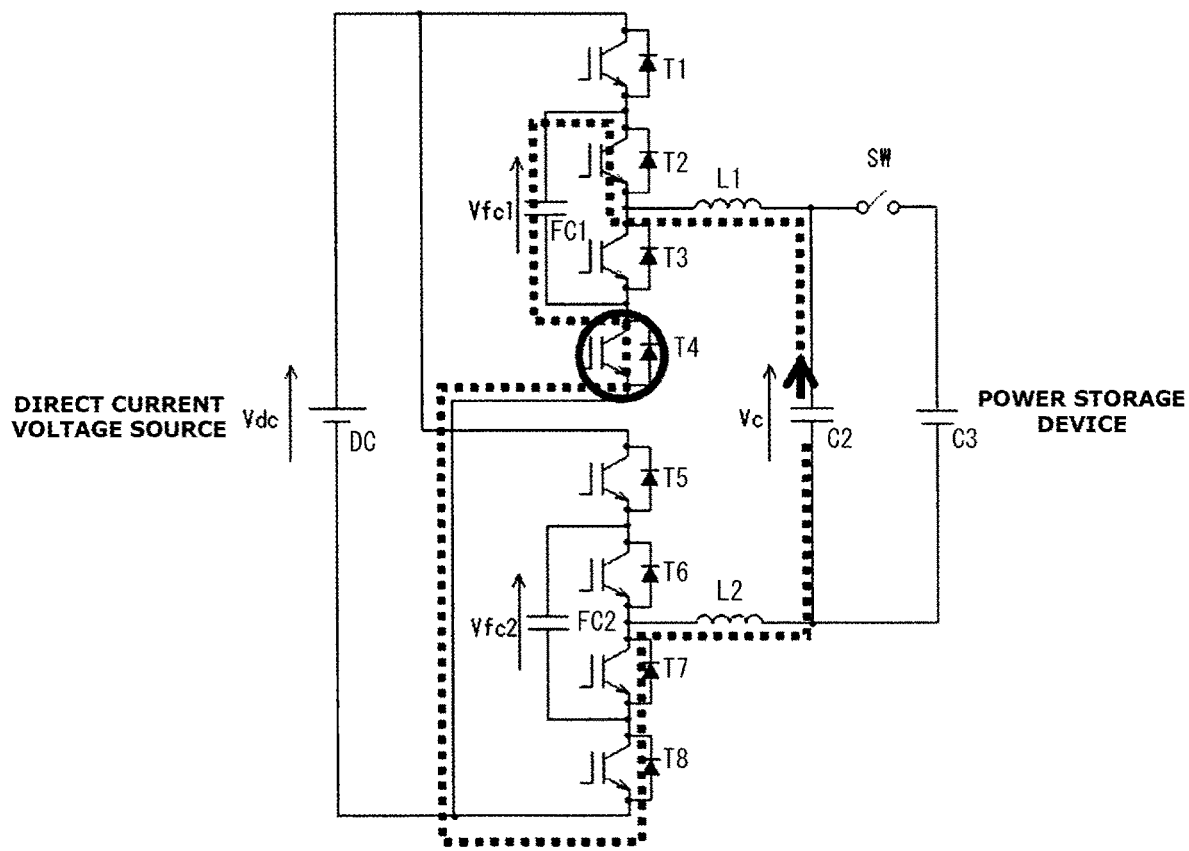
FIG. 10 is a diagram showing an electric current path by a switching pattern according to the fifth embodiment (No. 3).
Figure 11:
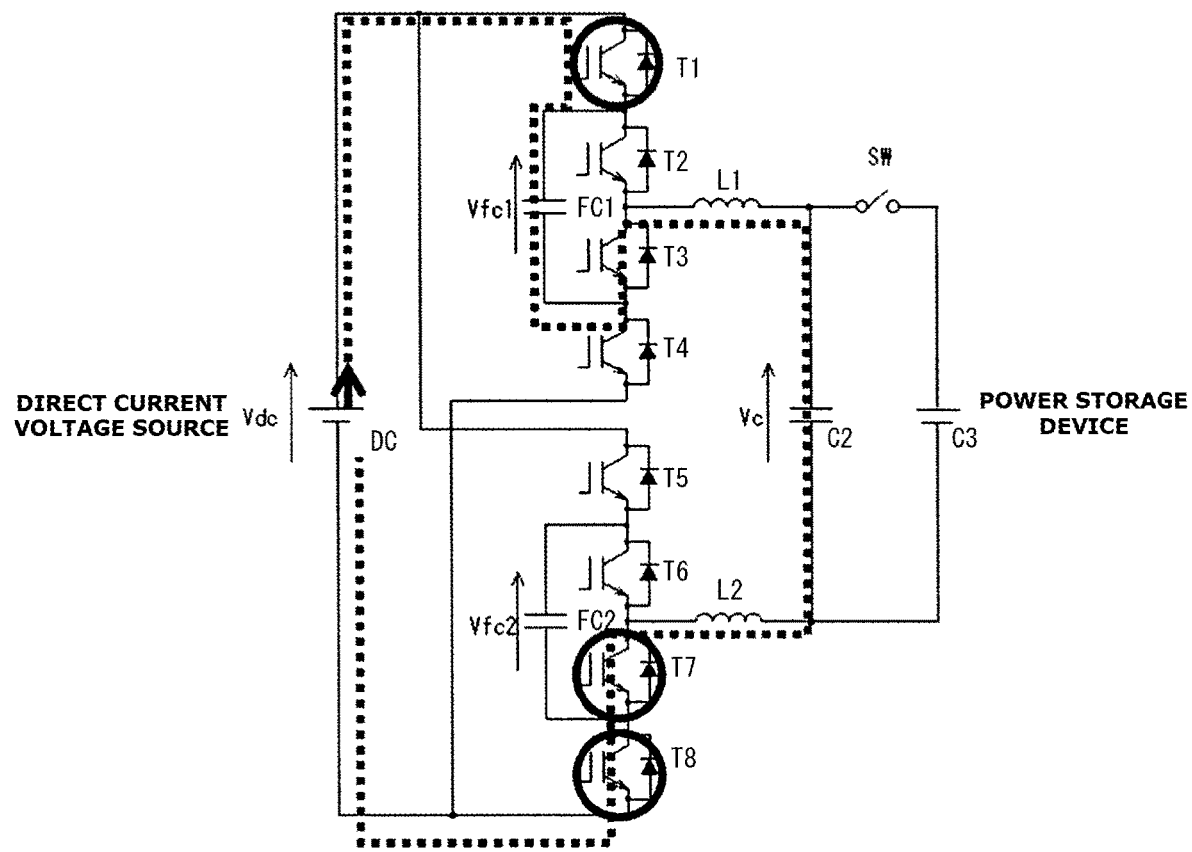
FIG. 11 is a diagram showing an electric current path by a switching pattern according to the fifth embodiment (No. 4).
Figure 12:
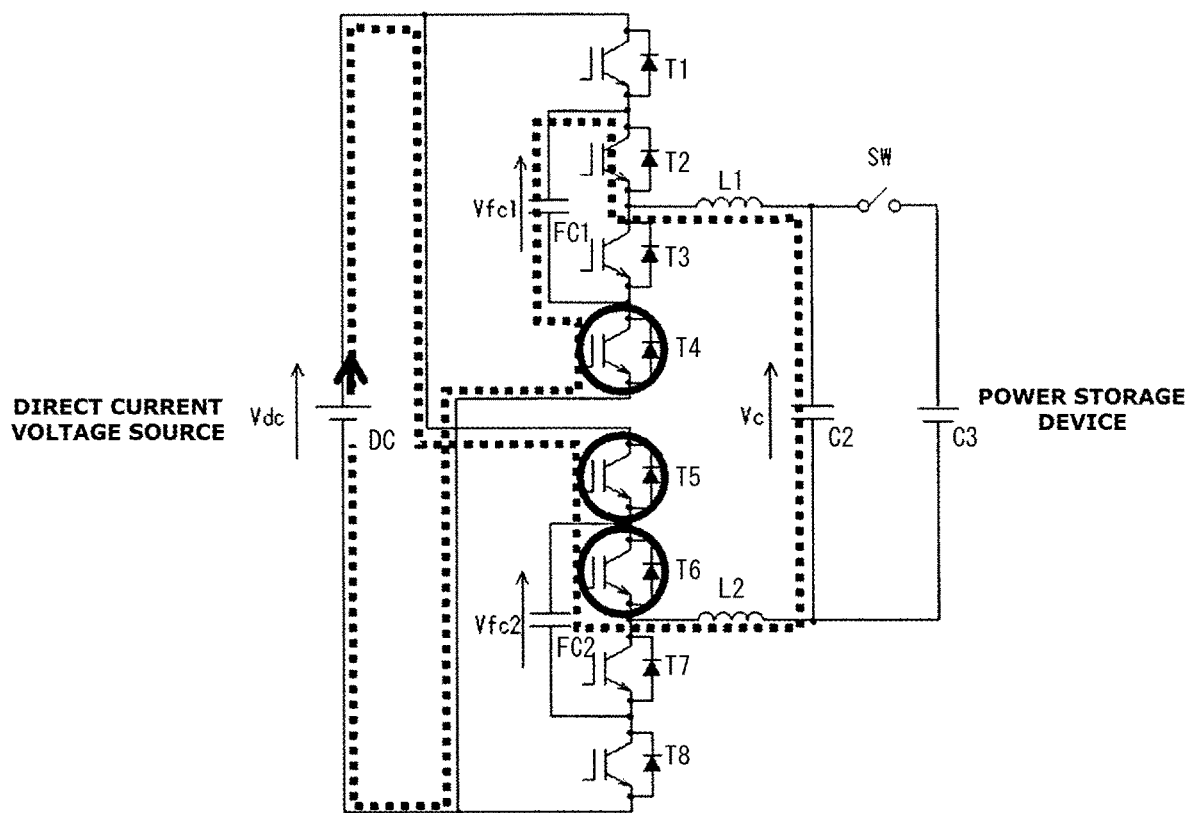
FIG. 12 is a diagram showing an electric current path by a switching pattern according to the fifth embodiment (No. 5).
Figure 13:
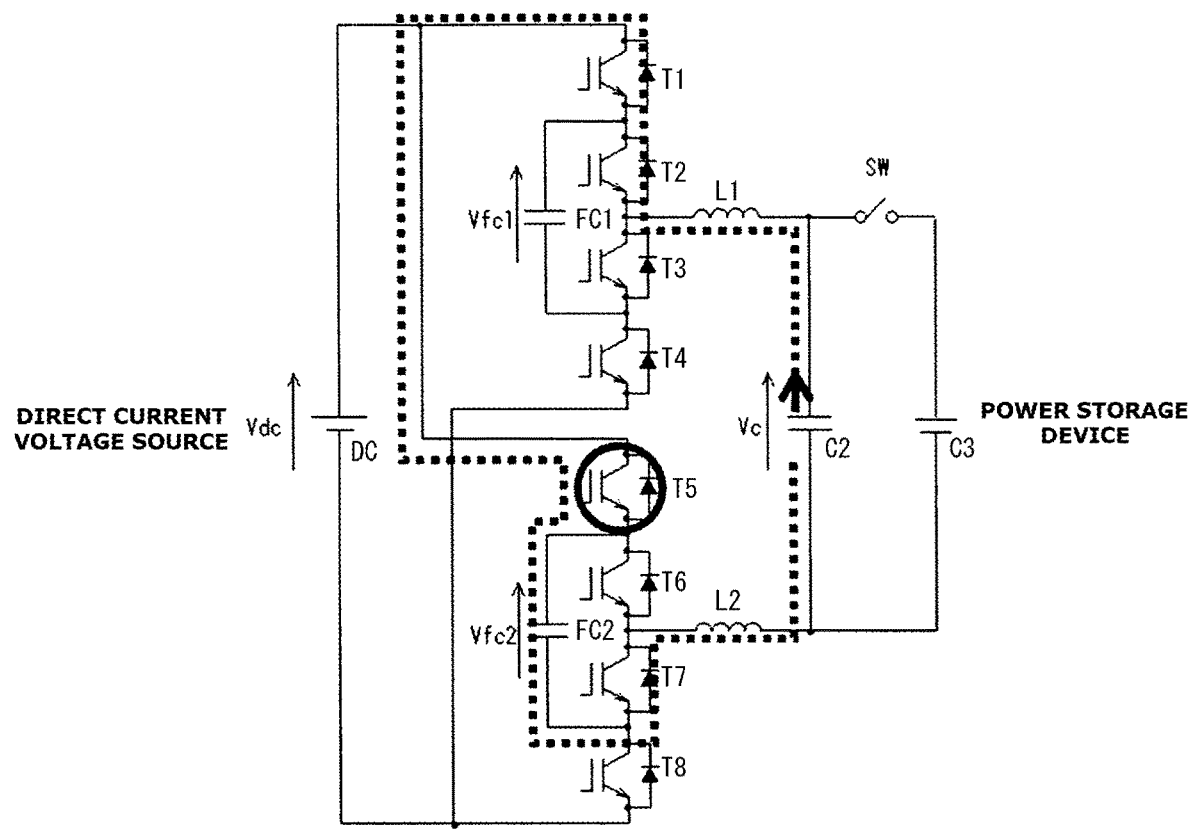
FIG. 13 is a diagram showing an electric current path by a switching pattern according to the fifth embodiment (No. 6).
Figure 14:
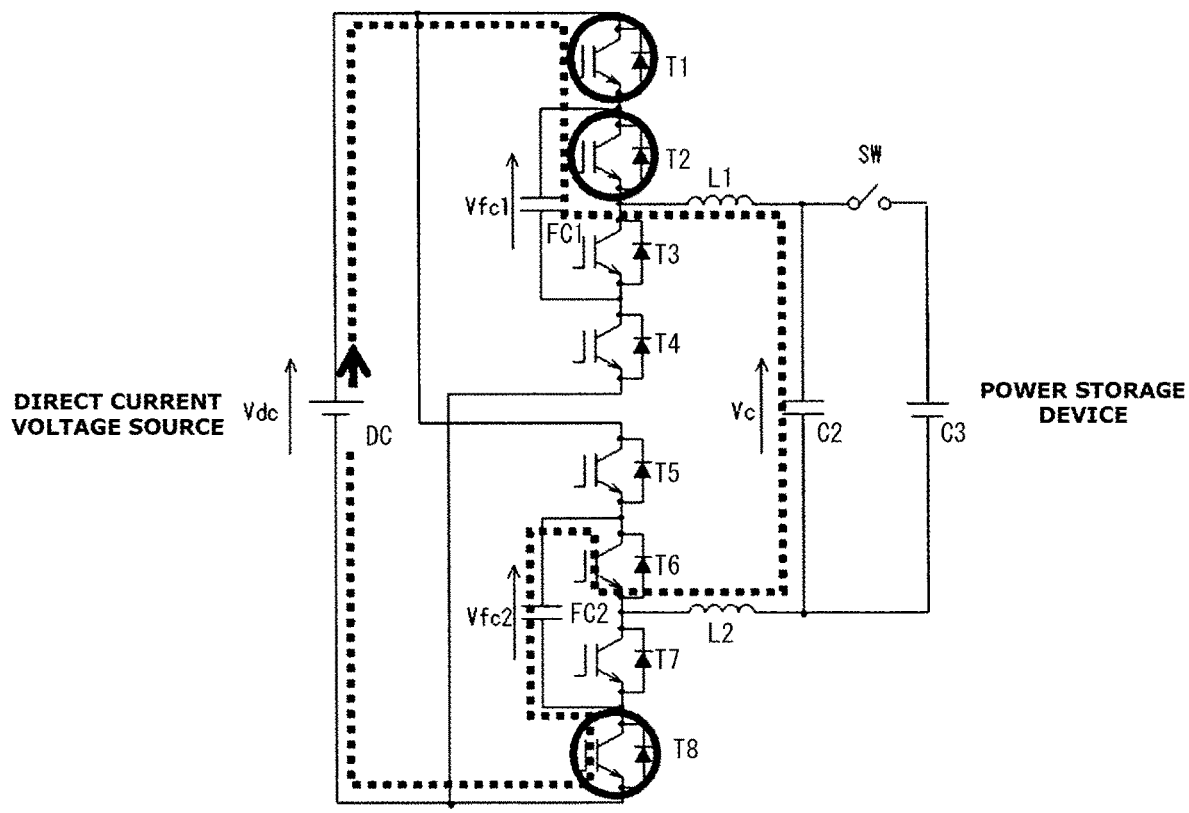
FIG. 14 is a diagram showing an electric current path by a switching pattern according to the fifth embodiment (No. 7).
Figure 15:
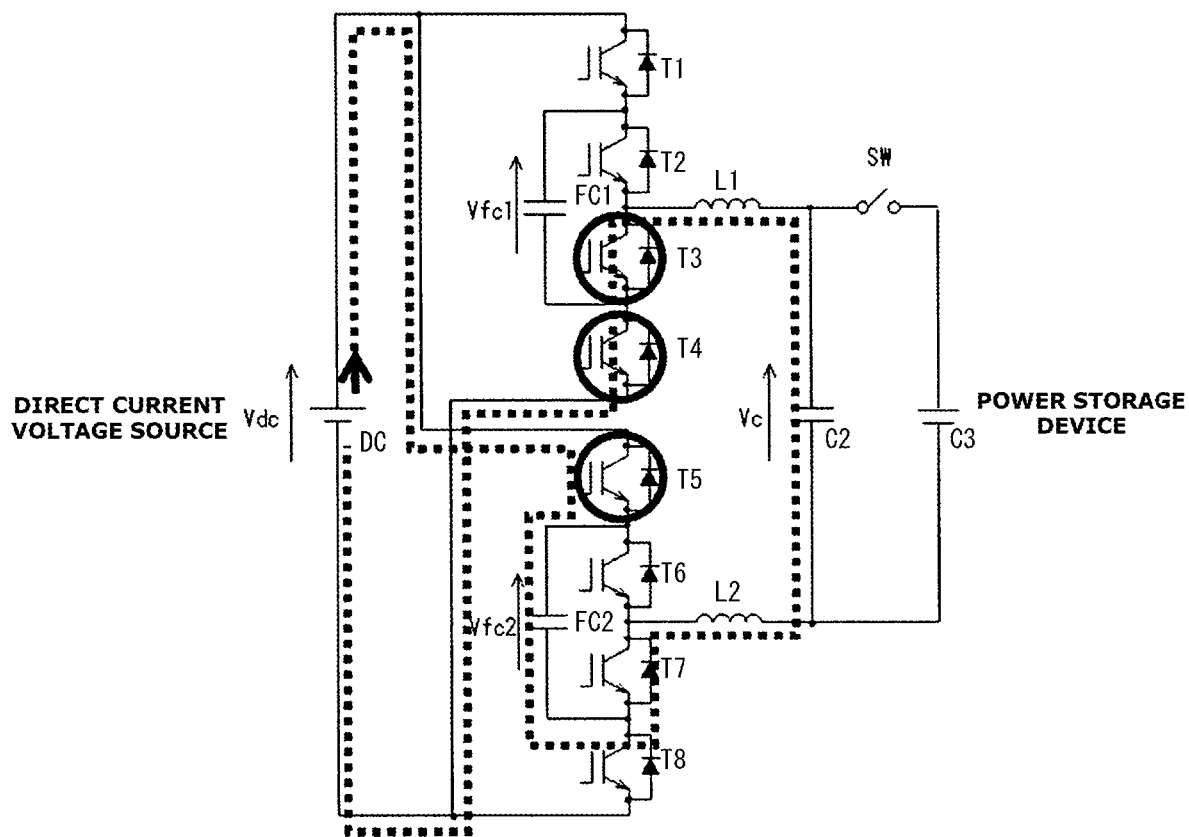
FIG. 15 is a diagram showing an electric current path by a switching pattern according to the fifth embodiment (No. 8).

In case of FIG. 10, an electric current flows along a path of C2→L1→T2→FC1→T4→T8→T7→L2. In case of FIG. 11, an electric current flows along a path of DC→T1→FC1→T3→L1→C2→L2→T7→T8. In case of FIG. 12, an electric current flows along a path of DC→T5→T6→L2→C2→L1→T2→FC1→T4. In case of FIG. 13, an electric current flows along a path of C2→L1→T2→T1→T5→FC2→T7→L2. In case of FIG. 14, an electric current flows along a path of DC→T1→T2→L1→C2→L2→T6→FC2→T8. In case of FIG. 15, an electric current flows along a path of DC→T5→FC2→T7→L2→C2→L1→T3→T4.

The first flying capacitor FC1 or the second flying capacitor FC2 is charged, whereas the filter capacitor C2 is charged in cases of No. 4 and No. 7 in Table 2, and discharged in cases of No. 3, No. 5, No. 6, and No. 8.

When the conditional expressions (1) and (2) are unsatisfied and the conditional expression (3) is satisfied, namely, when both the first and second flying capacitors FC1 and FC2 are already charged and it is required to charge the filter capacitor C2, the filter capacitor C2 is charged from the direct current voltage source DC or one of the first flying capacitor FC1 or the second flying capacitor FC2 that is higher in voltage value.

[Mathematical Expression 3]

$$(Vc < Vc^*) \qquad (3)$$

Figure 16:
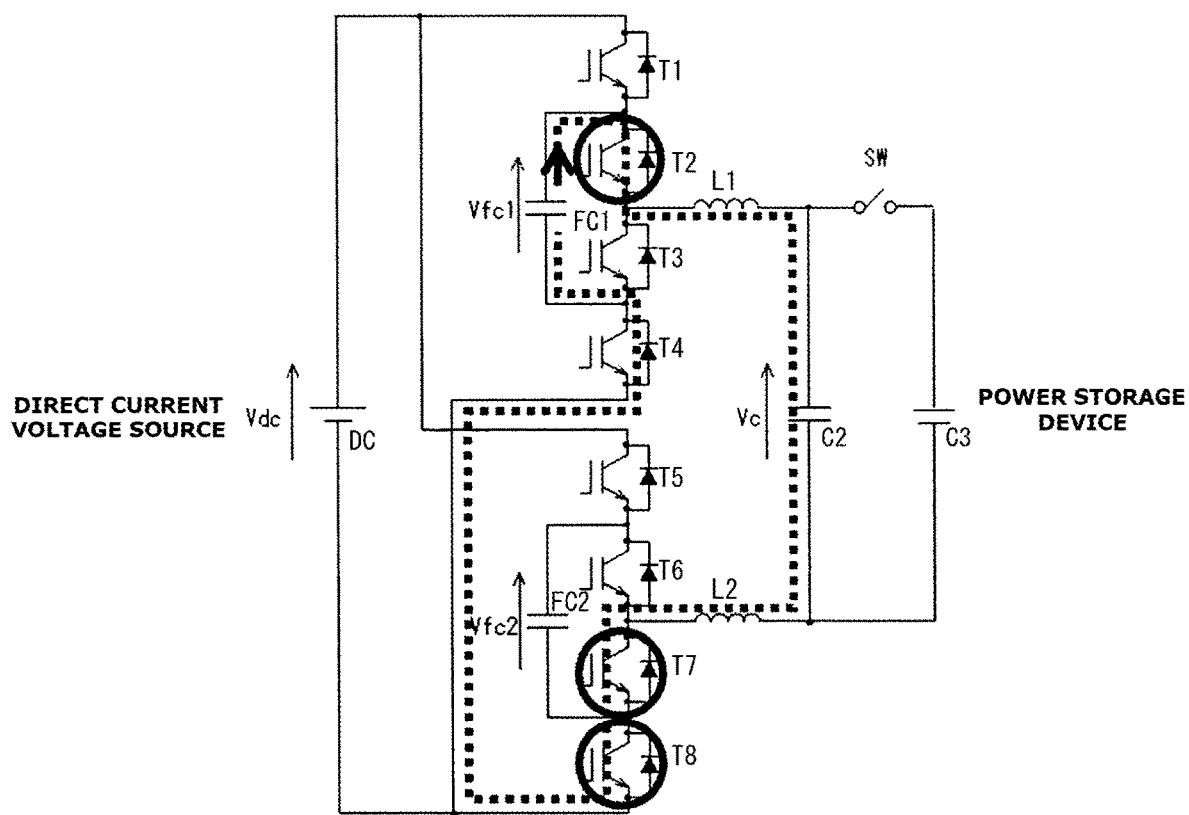
FIG. 16 is a diagram showing an electric current path by a switching pattern according to the fifth embodiment (No. 9).
Figure 17:
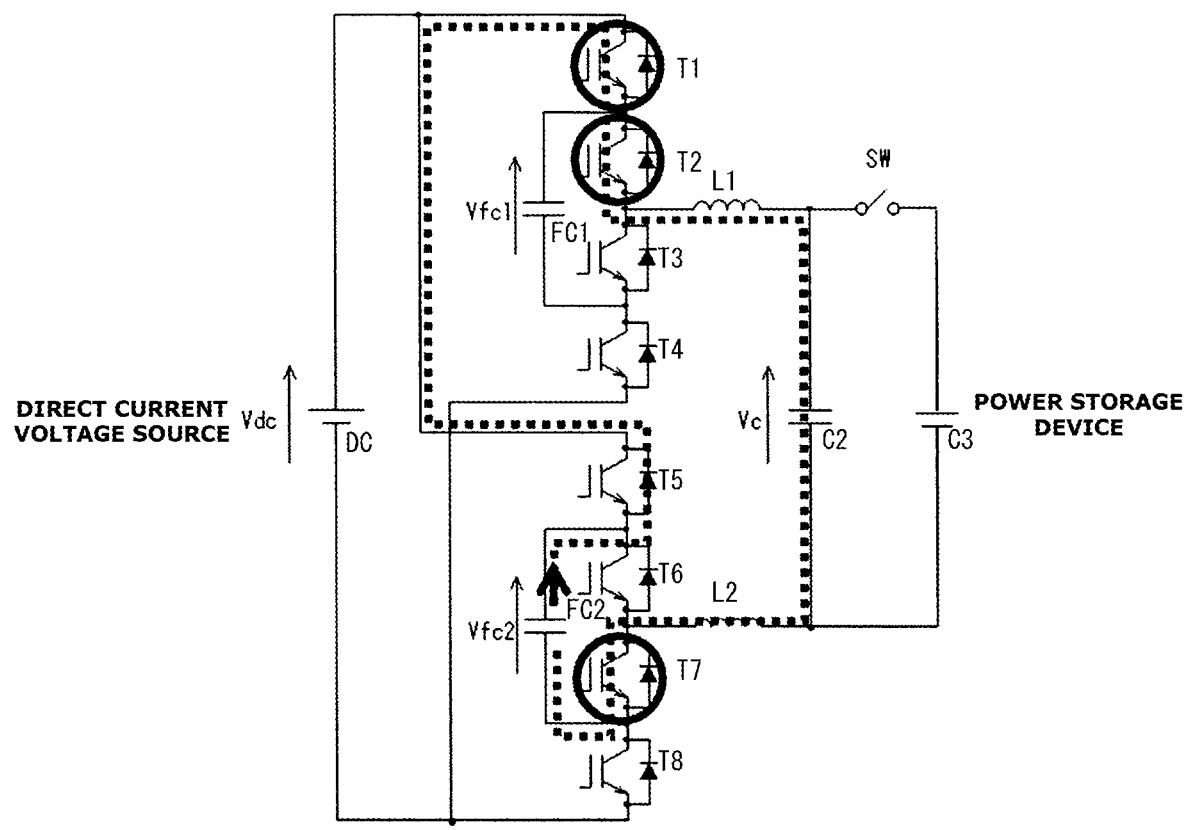
FIG. 17 is a diagram showing an electric current path by a switching pattern according to the fifth embodiment (No. 10).
Figure 18:
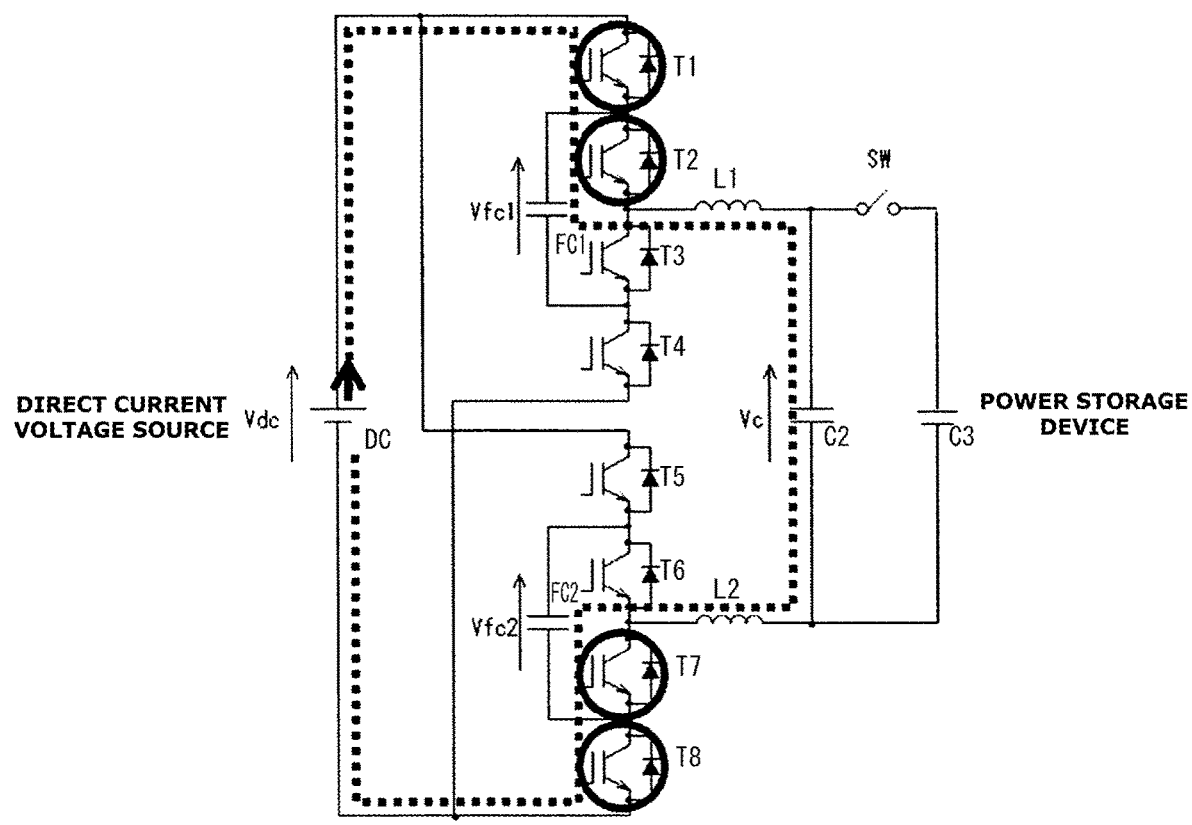
FIG. 18 is a diagram showing an electric current path by a switching pattern according to the fifth embodiment (No. 11).

Each semiconductor switching element is turned on and off by a switching pattern according to Table 3.

respectively. As shown in FIGS. 16, 17, and 18, each circle indicates that the circled semiconductor switching element is in on state. Broken lines represent the direction that an electric current flows, and an arrow indicates a positive direction.

In case of FIG. 16, an electric current flows along a path of FC1→T2→L1→C2→L2→T7→T8→T4. In case of FIG. 17, an electric current flows along a path of FC2→T5→T1→T2→L1→C2→L2→T7. In case of FIG. 18, an electric current flows along a path of DC→T1→T2→L1→C2→L2→T7→T8.

The filter capacitor C2 is charged, and in case of No. 9 in Table 3 (FIG. 16), the first flying capacitor FC1 is discharged, and in case of No. 10 in Table 3 (FIG. 17), the second flying capacitor FC2 is discharged.

When the mathematical expressions (1), (2) and (3) are unsatisfied, all the semiconductor switching elements are temporarily turned off into a standby state for self-discharging at the impedance of the FC-type three-level power conversion device or with an external circuit.

Furthermore, the on-time of the semiconductor switching element is set to a short time (about 10 μs) because the device may be damaged due to an overcurrent depending on the value of the filter reactor.

When the first flying capacitor voltage Vfc1 and the second flying capacitor voltage Vfc2 are within a range of E/2±tolerance, and the filter capacitor voltage Vc is within a range of the filter capacitor voltage command value Vc*±tolerance, all the semiconductor switching elements are once turned off to complete the charging.

Thereafter, the switch SW is turned on to connect the FC-type three-level power conversion device and the power storage device C3, and then power supply is performed in a similar manner as in the conventional technique. At this time, the first flying capacitor voltage Vfc1 and the second flying capacitor voltage Vfc2 are charged to the voltage value E/2, and the filter capacitor voltage Vc matches the voltage value of the power storage device C3, thereby suppressing an inrush current occurring when the switch SW

TABLE 3

| NO | CONDITIONS FOR SWITCHING PATTERN SELECTION | T1 | T2 | T3 | T4 | T5 | T6 | T7 | T8 |
|---|---|---|---|---|---|---|---|---|---|
| 9 | (Vc < MAX (Vfc1, Vfc2)) AND (Vfc1 > Vfc2) | OFF | ON | OFF | OFF | OFF | OFF | ON | ON |
| 10 | (Vc < MAX (Vfc1, Vfc2)) AND (Vfc1 < Vfc2) | ON | ON | OFF | OFF | OFF | OFF | ON | OFF |
| 11 | (Vc > MAX (Vfc1, Vfc2)) | ON | ON | OFF | OFF | OFF | OFF | ON | ON |

The switching patterns for No. 9, No. 10, and No. 11 in Table 3 are shown in FIG. 16, FIG. 17, and FIG. 18, is turned on. Furthermore, the load voltages of (E, E/2, 0) can be established from the initial state of power supply.

In the fifth embodiment, after the first and second flying capacitor voltages Vfc1 and Vfc2 are established at E/2, power can be supplied to the load such as the power storage device C3. This serves to reduce waveform distortion of the output voltage, and allow a highly accurate voltage to be applied to the load from the initial state of power supply to the load. Furthermore, since the filter capacitor voltage Vc matches the voltage value of the power storage device C3, it is possible to suppress a useless inrush current when the switch SW is turned on.

Figure 19:
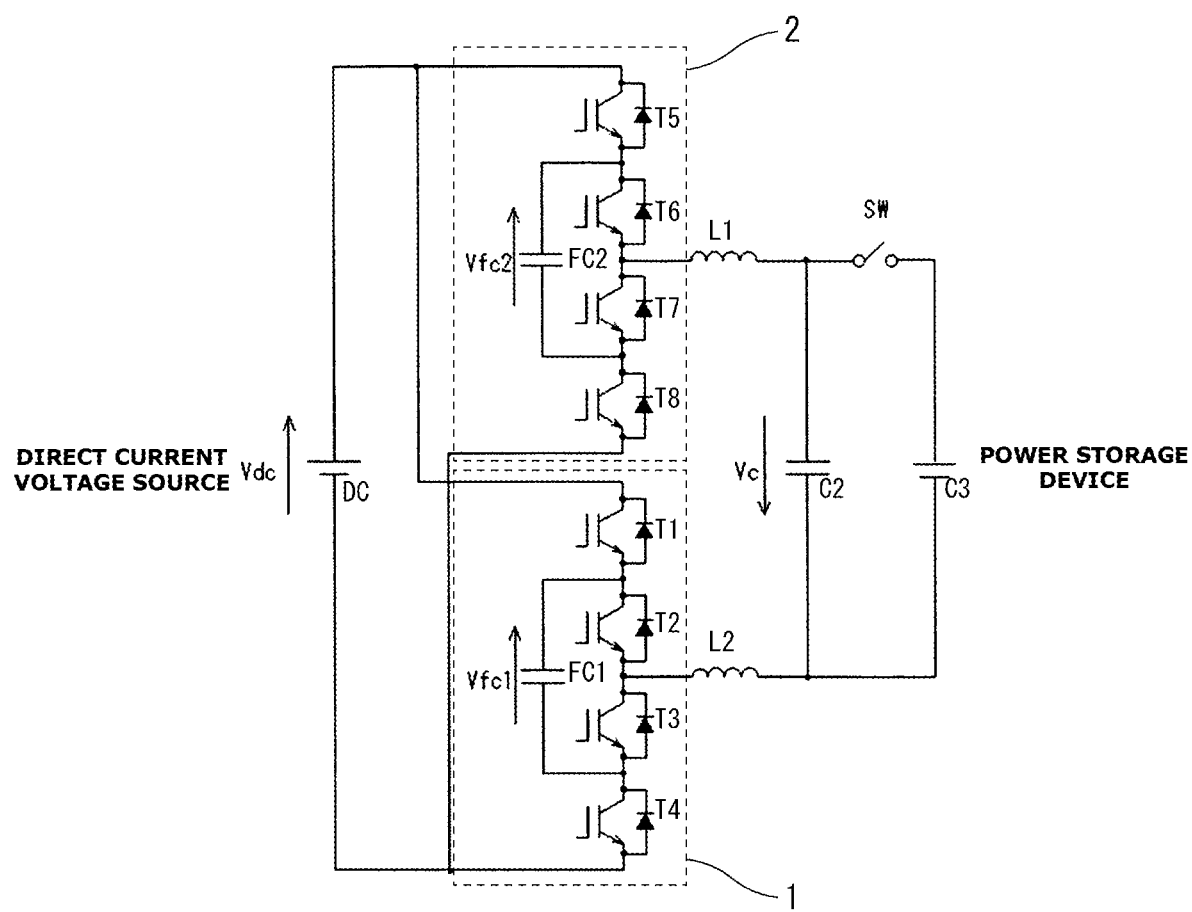
FIG. 19 is a circuit diagram showing an FC-type three-level power conversion device according to a sixth embodiment.

[Sixth Embodiment] In the sixth embodiment, Vc* is set as Vc*<0, namely, the direction of charging the filter capacitor C2 is reversed from that of the fifth embodiment. FIG. 19 shows configuration of an FC-type three-level power conversion device (FC-type three-level conversion device) according to the sixth embodiment. The first and second flying capacitors FC1 and FC2 and the first to eighth semiconductor switching elements T1 to T8 are modified from FIG. 7 to FIG. 19. Namely, with the first and second units 1 and 2 exchanged with each other, the mathematical expressions (1), (2) and (3), and Table 1, Table 2, and Table 3 of the fifth embodiment can be employed, thereby producing the same effect as in the fifth embodiment.

Figure 20:
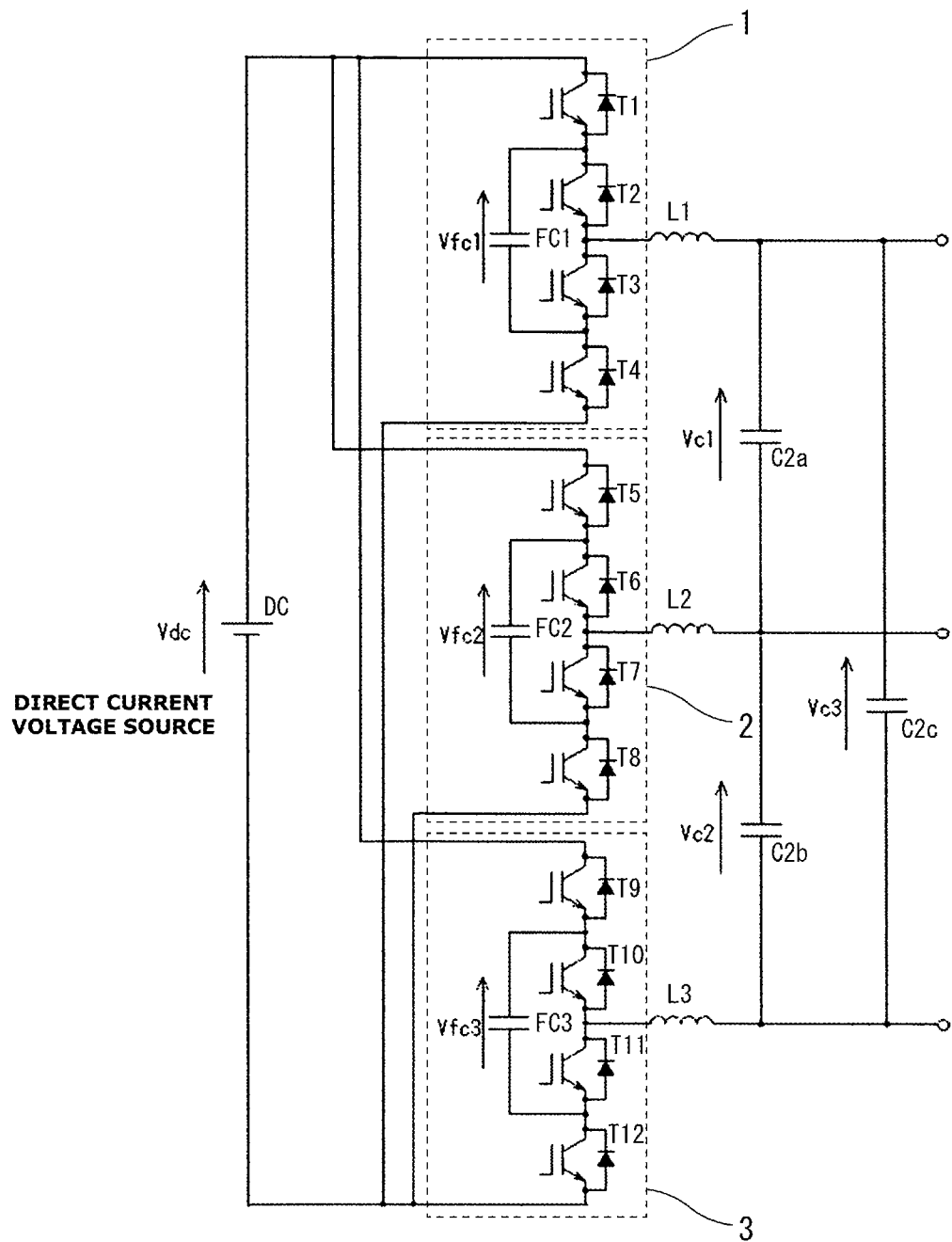
FIG. 20 is a circuit diagram showing an FC-type three-level power conversion device according to a seventh embodiment.
Figure 21:
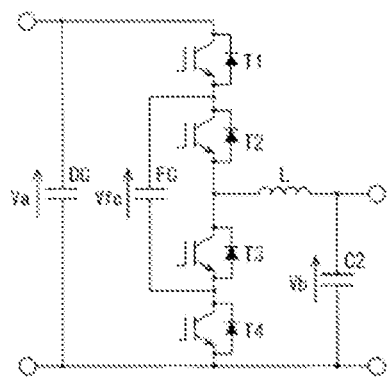
FIG. 21 is a circuit diagram showing a conventional FC-type three-level chopper circuit.
Figure 22:
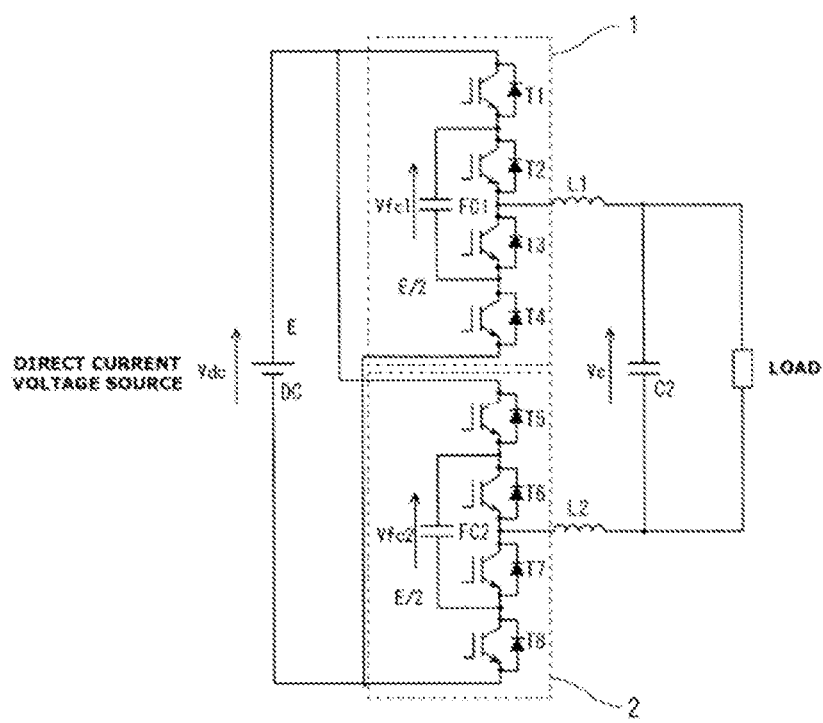
FIG. 22 is a circuit diagram showing a conventional FC-type three-level conversion device.

[Seventh Embodiment] In the present embodiment 7, the number of units in an FC-type three-level power conversion device having an LC filter is expanded to N (an integer of N=3 or more). In the seventh embodiment, N is set to 3 as shown in FIG. 20.

Each unit includes four semiconductor switching elements connected in series between a positive electrode and a negative electrode of a direct current voltage source DC. A flying capacitor is connected between a node between the first semiconductor switching element and the second semiconductor switching element and a node between the third semiconductor switching element and the fourth semiconductor switching element.

A node between the second semiconductor switching element and the third semiconductor switching element of each unit is connected to a first end of a corresponding one of first to Nth filter reactors. A filter capacitor is connected between second ends of corresponding two of the first to Nth filter reactors.

The first unit 1 is the unit whose flying capacitor is lowermost in voltage, and the second unit 2 is the unit whose flying capacitor is second lowermost in voltage. Furthermore, the first filter reactor L1 is the filter reactor whose first end is connected to the first unit 1, and the second filter reactor L2 is the filter reactor whose first end is connected to the second unit 2. Vc represents the voltage of the filter capacitor C connected between the second ends of the first and second filter reactors L1 and L2. The mathematical expressions (1), (2) and (3), and Table 1, Table 2, and Table 3 of the fifth embodiment are adopted, thereby producing the same effects as in the fifth embodiment.

Although the foregoing describes only details of disclosed specific embodiments of the present invention, it is clear to those skilled in the art that various variations and modifications are possible within the scope of the technical idea of the present invention, and such variations and modifications fall within the scope of the claims.

The direct current voltage source DC may be a direct current power supply or a direct current capacitor.

The invention claimed is:

1. A flying capacitor type three-level power conversion device comprising:
 a first unit including:
  first to fourth semiconductor switching elements connected in series between a positive electrode and a negative electrode of a direct current voltage source, and arranged in this order from the positive electrode to the negative electrode; and
  a first flying capacitor connected between a node between the first and second semiconductor switching elements and a node between the third and fourth semiconductor switching elements;
 a second unit including:
  fifth to eighth semiconductor switching elements connected in series between the positive electrode and the negative electrode of the direct current voltage source, and arranged in this order from the positive electrode to the negative electrode; and
  a second flying capacitor connected between a node between the fifth and sixth semiconductor switching elements and a node between the seventh and eighth semiconductor switching elements;
 a first filter reactor including a first end connected to a node between the second and third semiconductor switching elements;
 a second filter reactor including a first end connected to a node between the sixth and seventh semiconductor switching elements; and
 a filter capacitor connected between a second end of the first filter reactor opposite to the first end of the first filter reactor and a second end of the second filter reactor opposite to the first end of the second filter reactor,
 wherein the first to eighth semiconductor switching elements are configured to be turned on and off so as to cause an electric current to
 flow along a path including the first filter reactor and the second filter reactor, and
 charge the first flying capacitor, the second flying capacitor, and the filter capacitor to respective predetermined values, based on
 comparison between voltage of each of the first and second flying capacitors and half of voltage of the direct current voltage source,
 comparison between voltage of the filter capacitor and a filter capacitor voltage command value,
 comparison between the voltage of the direct current voltage source and a sum of the voltage of the first flying capacitor, the voltage of the second flying capacitor, and the filter capacitor voltage command value,
 comparison between the voltage of the direct current voltage source and a value obtained by subtracting the filter capacitor voltage command value from a sum of the voltage of the first flying capacitor and the voltage of the second flying capacitor,
 comparison between the voltage of each of the first and second flying capacitors and the voltage of the filter capacitor, and
 comparison between the voltage of the first flying capacitor and the voltage of the second flying capacitor,
 wherein:
 the first to eighth semiconductor switching elements are turned on and off in accordance with a switching pattern defined in a first table, when a first mathematical expression is satisfied;
 the first to eighth semiconductor switching elements are turned on and off in accordance with a switching pattern defined in a second table, when a second mathematical expression is satisfied in addition to a condition that the first mathematical expression is unsatisfied or all of the first mathematical expression and conditions for selection in the first table are not simultaneously satisfied;

the first to eighth semiconductor switching elements are turned on and off in accordance with a switching pattern defined in a third table, when the first mathematical expression is unsatisfied, the second mathematical expression is unsatisfied, and a third mathematical expression is satisfied;

the first to eighth semiconductor switching elements are turned off, when all of the first to third mathematical expressions are unsatisfied;

the first mathematical expression is as follows:

$$((Vfc1<Vdc/2) \text{ AND } (Vfc2<Vdc/2)) \tag{1};$$

the first table is as follows:

| NO | CONDITIONS FOR SWITCHING PATTERN SELECTION | T1 | T2 | T3 | T4 |
|---|---|---|---|---|---|
| 1 | ((Vc < Vc*) AND (Vfc1 + Vfc2 + Vc* < Vdc)) | ON | OFF | OFF | OFF |
| 2 | ((Vc > Vc*) AND (Vfc1 + Vfc2 − Vc* < Vdc)) | OFF | OFF | OFF | ON |

| NO | CONDITIONS FOR SWITCHING PATTERN SELECTION | T5 | T6 | T7 | T8 |
|---|---|---|---|---|---|
| 1 | ((Vc < Vc*) AND (Vfc1 + Vfc2 + Vc* < Vdc)) | OFF | OFF | OFF | ON |
| 2 | ((Vc > Vc*) AND (Vfc1 + Vfc2 − Vc* < Vdc)) | ON | OFF | OFF | OFF; | the second mathematical expression is as follows:

$$(MIN(Vfc1, Vfc2)<Vdc/2) \tag{2};$$

the second table is as follows:

| NO | CONDITIONS FOR SWITCHING PATTERN SELECTION | T1 | T2 | T3 | T4 |
|---|---|---|---|---|---|
| 3 | (Vfc1 < Vfc2) AND (Vfc1 < Vc) | OFF | OFF | OFF | ON |
| 4 | (Vfc1 < Vfc2) AND (Vc < Vc*) AND (Vfc1 > Vc) | ON | OFF | OFF | OFF |
| 5 | (Vfc1 < Vfc2) AND (Vc > Vc*) AND (Vfc1 > Vc) | OFF | OFF | OFF | ON |
| 6 | (Vfc1 > Vfc2) AND (Vfc2 < Vc) | OFF | OFF | OFF | OFF |
| 7 | (Vfc1 > Vfc2) AND (Vfc2 > Vc) AND (Vc < Vc*) | ON | ON | OFF | OFF |
| 8 | (Vfc1 > Vfc2) AND (Vfc2 > Vc) AND (Vc > Vc*) | OFF | OFF | ON | ON |

| NO | CONDITIONS FOR SWITCHING PATTERN SELECTION | T5 | T6 | T7 | T8 |
|---|---|---|---|---|---|
| 3 | (Vfc1 < Vfc2) AND (Vfc1 < Vc) | OFF | OFF | OFF | OFF |
| 4 | (Vfc1 < Vfc2) AND (Vc < Vc*) AND (Vfc1 > Vc) | OFF | OFF | ON | ON |
| 5 | (Vfc1 < Vfc2) AND (Vc > Vc*) AND (Vfc1 > Vc) | ON | ON | OFF | OFF |
| 6 | (Vfc1 > Vfc2) AND (Vfc2 < Vc) | ON | OFF | OFF | OFF |
| 7 | (Vfc1 > Vfc2) AND (Vfc2 > Vc) AND (Vc < Vc*) | OFF | OFF | OFF | ON |
| 8 | (Vfc1 > Vfc2) AND (Vfc2 > Vc) AND (Vc > Vc*) | ON | OFF | OFF | OFF; | the third mathematical expression is as follows:

$$(Vc<Vc^*) \tag{3};$$

the third table is as follows:

| NO | CONDITIONS FOR SWITCHING PATTERN SELECTION | T1 | T2 | T3 | T4 |
|---|---|---|---|---|---|
| 9 | (Vc < MAX (Vfc1, Vfc2)) AND (Vfc1 > Vfc2) | OFF | ON | OFF | OFF |
| 10 | (Vc < MAX (Vfc1, Vfc2)) AND (Vfc1 < Vfc2) | ON | ON | OFF | OFF |
| 11 | (Vc > MAX (Vfc1, Vfc2)) | ON | ON | OFF | OFF |

| NO | CONDITIONS FOR SWITCHING PATTERN SELECTION | T5 | T6 | T7 | T8 |
|---|---|---|---|---|---|
| 9 | (Vc < MAX (Vfc1, Vfc2)) AND (Vfc1 > Vfc2) | OFF | OFF | ON | ON |
| 10 | (Vc < MAX (Vfc1, Vfc2)) AND (Vfc1 < Vfc2) | OFF | OFF | ON | OFF |
| 11 | (Vc > MAX (Vfc1, Vfc2)) | OFF | OFF | ON | ON; |

Vfc1 represents the voltage of the first flying capacitor;
Vfc2 represents the voltage of the second flying capacitor;
Vdc represents the voltage of the direct current voltage source;
Vc represents the voltage of the filter capacitor;
Vc* represents the filter capacitor voltage command value; and
T1-T8 represent the first to eighth semiconductor switching elements.

2. The flying capacitor type three-level power conversion device as claimed in claim 1, further comprising:

third to Nth units, wherein N represents an integer greater than or equal to four, each including:
first to fourth semiconductor switching elements connected in series between the positive electrode and the negative electrode of the direct current voltage source, and arranged in this order from the positive electrode to the negative electrode; and
a flying capacitor connected between a node between the first and second semiconductor switching elements of a respective one of the third to Nth units, and a node between the third and fourth semiconductor switching elements of the respective one of the third to Nth units;

third to Nth filter reactors each including a first end connected to a node between the second and third semiconductor switching elements of a corresponding one of the third to Nth units; and filter capacitors each connected between second ends of corresponding two of the third to Nth filter reactors opposite to the first ends of the corresponding two of the third to Nth filter reactors, wherein the first flying capacitor of the first unit has a lowest voltage among the respective flying capacitors of the first to Nth units; and the second flying capacitor of the second unit has a second lowest voltage among the respective flying capacitors of the first to Nth units.

* * * * *